United States Patent
Hammitt et al.

(10) Patent No.: US 7,567,915 B2
(45) Date of Patent: Jul. 28, 2009

(54) ONTOLOGY-DRIVEN INFORMATION SYSTEM

(75) Inventors: Lisa C. Hammitt, San Francisco, CA (US); Jörg Beckert, San Francisco, CA (US)

(73) Assignee: 6100198 Canada Inc., West Vancouver (CA)

(*) Notice: Subject to any disclaimer, the term of this patent is extended or adjusted under 35 U.S.C. 154(b) by 125 days.

(21) Appl. No.: 11/583,945

(22) Filed: Oct. 20, 2006

(65) Prior Publication Data

US 2007/0038500 A1 Feb. 15, 2007

Related U.S. Application Data

(62) Division of application No. 09/642,200, filed on Aug. 18, 2000, now Pat. No. 7,200,563.

(60) Provisional application No. 60/150,204, filed on Aug. 20, 1999, provisional application No. 60/165,147, filed on Nov. 12, 1999.

(51) Int. Cl.
G06F 17/60 (2006.01)
(52) U.S. Cl. ............................................. 705/7; 705/27
(58) Field of Classification Search ..................... 705/8, 705/7, 27
See application file for complete search history.

(56) References Cited

U.S. PATENT DOCUMENTS

| | | | |
|---|---|---|---|
| 5,465,319 A | 11/1995 | Ahamed | |
| 5,628,011 A | 5/1997 | Ahamed et al. | |
| 5,764,953 A | 6/1998 | Collins et al. | |
| 5,794,050 A | 8/1998 | Dahlgren et al. | |
| 5,995,945 A | * 11/1999 | Notani et al. | ................. 705/28 |
| 6,041,306 A | 3/2000 | Du et al. | |

(Continued)

FOREIGN PATENT DOCUMENTS

EP 0895171 A2 2/1999

OTHER PUBLICATIONS

Rosenberg"Introduction: The methods of Ontology", Dec. 1997, pp. 1-4.*

(Continued)

*Primary Examiner*—Romain Jeanty
(74) *Attorney, Agent, or Firm*—Alleman Hall McCoy Russell & Tuttle LLP

(57) ABSTRACT

An ontology-driven information system includes a plurality of models, each of which expresses an aspect of a business domain using concepts and relationships between concepts. An ontology, which is in communication with each of the plurality of models, provides uniform definitions for the concepts and relationships between concepts used in the plurality of models. A method for executing an interaction flow model includes receiving an event and categorizing the received event. Once the event is categorized, a situation that matches the categorized received event is identified. One or more tasks are then executed for the situation. The execution of the one or more tasks can include either an interpretation of a model or the execution of a method of an object. The information system also includes a user and application interface and a reasoning engine that is in communication with the user and application interface. A knowledge manager is in communication with the user and application interface and is interfaced with the reasoning engine. A distributed information service also is in communication with the reasoning engine, the knowledge manager, and the user and application interface.

15 Claims, 12 Drawing Sheets

U.S. PATENT DOCUMENTS

| | | | |
|---|---|---|---|
| 6,199,047 | B1 | 3/2001 | Dimino et al. |
| 6,263,358 | B1 * | 7/2001 | Lee et al. .................... 718/100 |
| 6,278,977 | B1 | 8/2001 | Agrawal et al. |
| 6,304,864 | B1 | 10/2001 | Liddy et al. |
| 6,405,215 | B1 | 6/2002 | Yaung |
| 6,411,936 | B1 | 6/2002 | Sanders |
| 6,484,155 | B1 | 11/2002 | Kiss et al. |
| 6,505,191 | B1 | 1/2003 | Baclawski |
| 6,519,631 | B1 | 2/2003 | Rosenchein et al. |
| 6,546,381 | B1 | 4/2003 | Subramanian et al. |
| 6,564,263 | B1 | 5/2003 | Bergman et al. |
| 6,601,234 | B1 | 7/2003 | Bowman-Amuah |
| 6,754,181 | B1 | 6/2004 | Elliott et al. |
| 2005/0209914 | A1 | 9/2005 | Nguyen et al. |

OTHER PUBLICATIONS

Feurer et al., "Performance Measurement in Strategic Change", 1995, Benchmarking for Quality Management & Technology, vol. 2, No. 2, p. 64.

The Technical Resource Connection, Inc., "Common Business Objects and Common Facilities"; Initial Submission Version 1.0; Jan. 1997; pp. 1-58.

Shan et al., "Business Process Low Management and its Application in the Telecommunications Management Network", Oct. 1996, Hewlett Packard Journal, pp. 1-9.

Howard et al., "Share the Ontology in XML-based Trading Architecture", Mar. 1999, Communications of the ACM v42n3 pp. 110-111, Dialog file 15, Accession No. 01784430.

Fernandes et al., "A Structured Modeling Approach to Object-Oriented Representation of Business Domains", 1998, Journal of Conceptual Modeling, Issue: 16, pp. 1-17.

E. Mena et al., "Observer: An Approach for Query Processing in Global Information Systems Based on Interoperation Across Pre-existing Ontologies," Proceedings from First IFCIS International Conference on Cooperative Information Systems (CoopIS '96), Brussells, Belgium, Jun. 19-21, 1996, pp. 14-25.

P.R.S. Visser et al., "Resolving Ontological Heterogeneity in the KRAFT Project," Proceedings of Tenth International Workshop on Database and Expert Systems Applications, Florence, Italy, Sep. 1-3, 1999, pp. 668-677.

http://ksl.stanford.edu/kst/what-is-an-ontology.html.

Lang et al., "Modeling Business Rules with Situation/Activation Diagrams", 1997; IEEE; Page.

Peter et al., Object-Orientation in Business Process Modeling through Applying Event Driven Process Chains (EPC) in UML; 1998 IEEE; pp. 102-112.

* cited by examiner

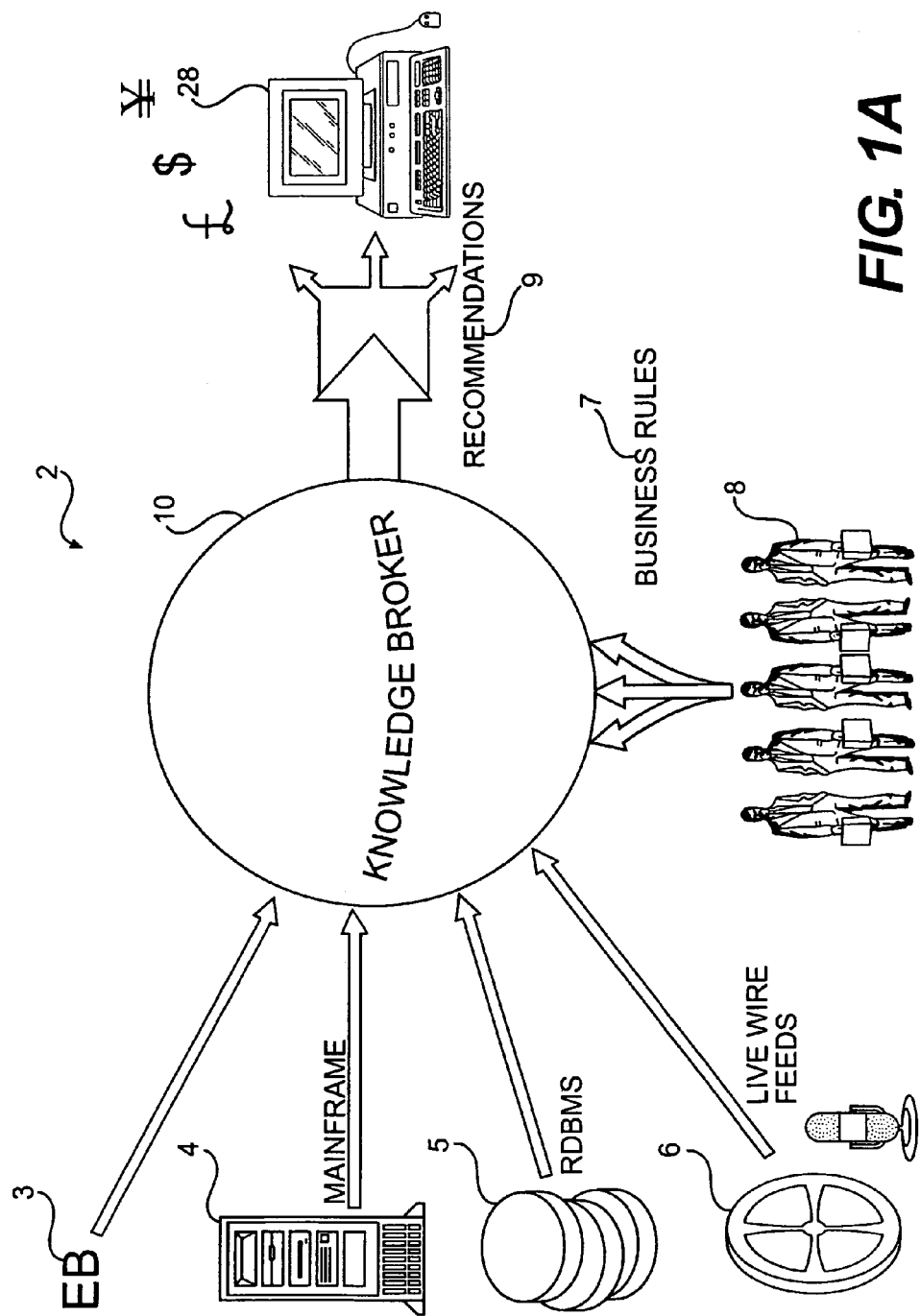

ONTOLOGY-DRIVEN INFORMATION SYSTEM

CROSS REFERENCE TO RELATED APPLICATIONS

This is a division of application Ser. No. 09/642,200, filed Aug. 18, 2000 now U.S. Pat. No. 7,200,563, entitled "Ontology-Driven Information System," which claims the benefit of U.S. Provisional Application No. 60/150,204, filed Aug. 20,1999, entitled "Ontology-Driven Information System," and U.S. Provisional Application No. 60/165,147, filed Nov. 12, 1999, entitled "Ontology-Driven Information System," all of which are incorporated herein by reference.

BACKGROUND OF THE INVENTION

The present invention relates generally to computers and, more particularly, to an ontology-driven information system.

Since the development of the Internet's World Wide Web ("the web"), the number of companies engaged in electronic commerce ("e-commerce") has steadily increased. Indeed, companies now offer a multitude of products and services online. By conducting business on the web, companies can decrease operational costs and expedite business activities. The web is also an effective medium for presenting information to and gathering information from customers.

To gain an edge in the increasingly competitive marketplace, companies must interact with their customers in an intelligent, personalized, and productive manner. One way for companies to further this objective is to create meaningful interactions with customers on the web. At present, many e-commerce systems do not enable companies to create meaningful, two-way interactions with customers, but instead merely implement one-way transactions, e.g., processing an order or a service request, initiated by the customer. As such, these e-commerce systems do not help companies interact effectively with their customers on the web.

To enable meaningful interactions with customers on the web, an e-commerce system should provide the following functionality. First, the system must access data that is distributed across numerous sources and react to events coming from numerous sources. In the case of a large enterprise, the data may reside in relational database management systems (RDBMSs), flat files, and large-scale packaged applications. The events may come from Internet feeds, news services, and e-commerce systems (exchanges). In addition, the events may come from event-based Internet middleware. Second, the system must analyze the distributed data and transform such data into an intelligent, personalized recommendation in real time. If the analysis is not conducted in real time, then the customer will have to wait for the intelligent, personalized recommendation. Any significant delay, e.g., a few minutes, decreases the likelihood that the customer will act on the recommendation. Third, the system must accommodate frequent changes in business conditions. In particular, it must be easy to change the business rules and business processes used to transform the data into the intelligent, personalized recommendation. If the business rules and business processes cannot be easily changed, then the system will not be able to keep up with the way the company is doing business.

Unfortunately, existing e-commerce systems do not provide the above-described functionality. One known e-commerce system generates personalized recommendations by matching business rules against customer attributes, e.g., age group, geographic region, and buying history. In this e-commerce system, however, it is difficult to change the business rules to adapt to changing business conditions. To illustrate this point, examples of the business rules used in this system are shown below:

| Rule No. 1: | If | Customer lives in California && |
| --- | --- | --- |
| | | They are 18-30 years old && |
| | | They selected a backpack |
| | Then | Recommend tents with a priority of 10. |
| Rule No. 2: | If | Customer lives in New York && |
| | | They are 31-50 years old && |
| | | They selected a backpack |
| | Then | Recommend hiking shoes with a priority of 10. |

In the event that business conditions change, Rule Nos. 1 and 2 must be changed to reflect the new business conditions. For example, consider a situation in which market analysis shows that the age group breakdowns in Rule Nos. 1 and 2 should be changed from 18-30 years old and 31-50 years old to 18-34 years old and 35-50 years old, respectively. To implement this change, it would be necessary to change each occurrence of "18-30 years old" to "18-34 years old" and to change each occurrence of "31-50 years old" to "35-50 years old." As there are only two business rules in this simplified example, making the required changes is not a major undertaking. To adequately model any non-trivial domain, however, hundreds or thousands of business rules may be required. Thus, in real world applications the process of changing myriad business rules in the form of Rule Nos. 1 and 2 is not only tedious, but also prone to error. Moreover, because the business rules are typically entered on a logic language level, skilled computer personnel is generally required to implement the changes. This is problematic because non-technical business managers may not be able to change the business rules as quickly as needed to keep up with the way the company is doing business.

Another example of changing business rules is the occurrence of additional context that requires that a different result be implemented when a given rule is satisfied. For instance, the system may be required to incorporate a customer's purchase history to formulate an intelligent recommendation. By way of example, if a customer has recently purchased a tent, then a recommendation suggesting that the customer purchase a tent would normally not be considered to be an intelligent recommendation.

In view of the foregoing, what is needed is an e-commerce system that analyzes distributed data and transforms such data into intelligent, personalized recommendations in real time using flexible business rules that can be easily adapted to ever-changing situations.

SUMMARY OF THE INVENTION

Broadly speaking, the present invention fills this need by providing an information system that transforms raw data from disparate sources into intelligent, personalized recommendations that may be used to drive business transactions.

In accordance with one aspect of the invention, an ontology-driven information system is provided. This information system includes a plurality of models, each of which expresses an aspect of a business domain using concepts and relationships between concepts. An ontology, which is in communication with each of the plurality of models, provides uniform definitions for the concepts and relationships between concepts used in the plurality of models. The use of the uniform definitions in the plurality of models avoids redundancy in the models, provides consistency between the models, and enables the plurality of models to provide an overall model of the business domain that is more expressive than an overall model based on a plurality of models that does not use uniform definitions. In one embodiment, the uniform definitions in the ontology can be changed on the fly by a business manager.

In accordance with another aspect of the invention, a method for executing an interaction flow model is provided. This method includes receiving a plurality of events and categorizing the received event events. Once the events are categorized, a situation that matches the categorized received events is identified. One or more tasks are then executed for the situation. The execution of the one or more tasks can include either an interpretation of a model (e.g., a rule base) or the execution of a method of an object.

In accordance with yet another aspect of the invention, an information system is provided. The information system includes a user and application interface and a reasoning engine that is in communication with the user and application interface. The system further includes a knowledge manager that is in communication with the user and application interface and is interfaced with the reasoning engine. A distributed information service also is in communication with the reasoning engine, the knowledge manager, and the user and application interface. The reasoning engine may be configured to work in conjunction with the knowledge manager to enable the reasoning engine to handle events by executing one or more specific tasks prescribed by the knowledge manager to handle the events most appropriately. In one embodiment, the knowledge manager includes an interaction flow model that is a repository for abstract situations to handle the events received by the reasoning engine, with the situations defining the one or more tasks that are to be executed by the reasoning engine.

In another embodiment, the information system includes a reasoning engine and a knowledge manager. The reasoning engine may be configured to derive a set of conclusions using a set of premises and to execute actions that are attached to the set of conclusions. The set of premises may be encoded using a plurality of models. The knowledge manager serves as a repository of the plurality of models. Each of the plurality of models is configured to define situations that occur in decision making to achieve a goal state. The knowledge manager includes an ontology, which is a collection of concepts and contexts used to provide a common vocabulary for defining rules, querying disparate data sources, and making actionable recommendations. As such, the ontology provides consistency between the plurality of models.

In accordance with a further aspect of the invention, a computer readable media having program instructions for executing an interaction flow model is provided. The computer readable media includes program instructions for receiving an event (or a plurality of events), program instructions for categorizing the received events, program instructions for identifying a situation that matches the categorized received events, and program instructions for executing one or more tasks for the situation. The execution of the one or more tasks includes one of an interpretation of a model and execution of a method of an object.

The information system of the invention enables e-market participants to apply business rules to data captured from disparate sources, e.g., existing enterprise databases and the Internet, to match buyers' interests with sellers' expertise taking into account goals, preferences, behaviors, and market context. In this manner, the information system provides more accurate and timely recommendations that increase the likelihood that a transaction will occur at the moment of contact. Such accurate and timely recommendations also increase customer satisfaction and thereby reduce customer attrition. Another advantage of the information system is that it uses business rules that are constructed using ordinary terms that can be changed on the fly by a non-technical business user. This helps reduce maintenance costs and increase responsiveness.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

FIG. 1A is a schematic diagram illustrating the functionality of an ontology-driven information system in accordance with one embodiment of the invention.

DETAILED DESCRIPTION OF EXEMPLARY EMBODIMENTS

Figure 1B:
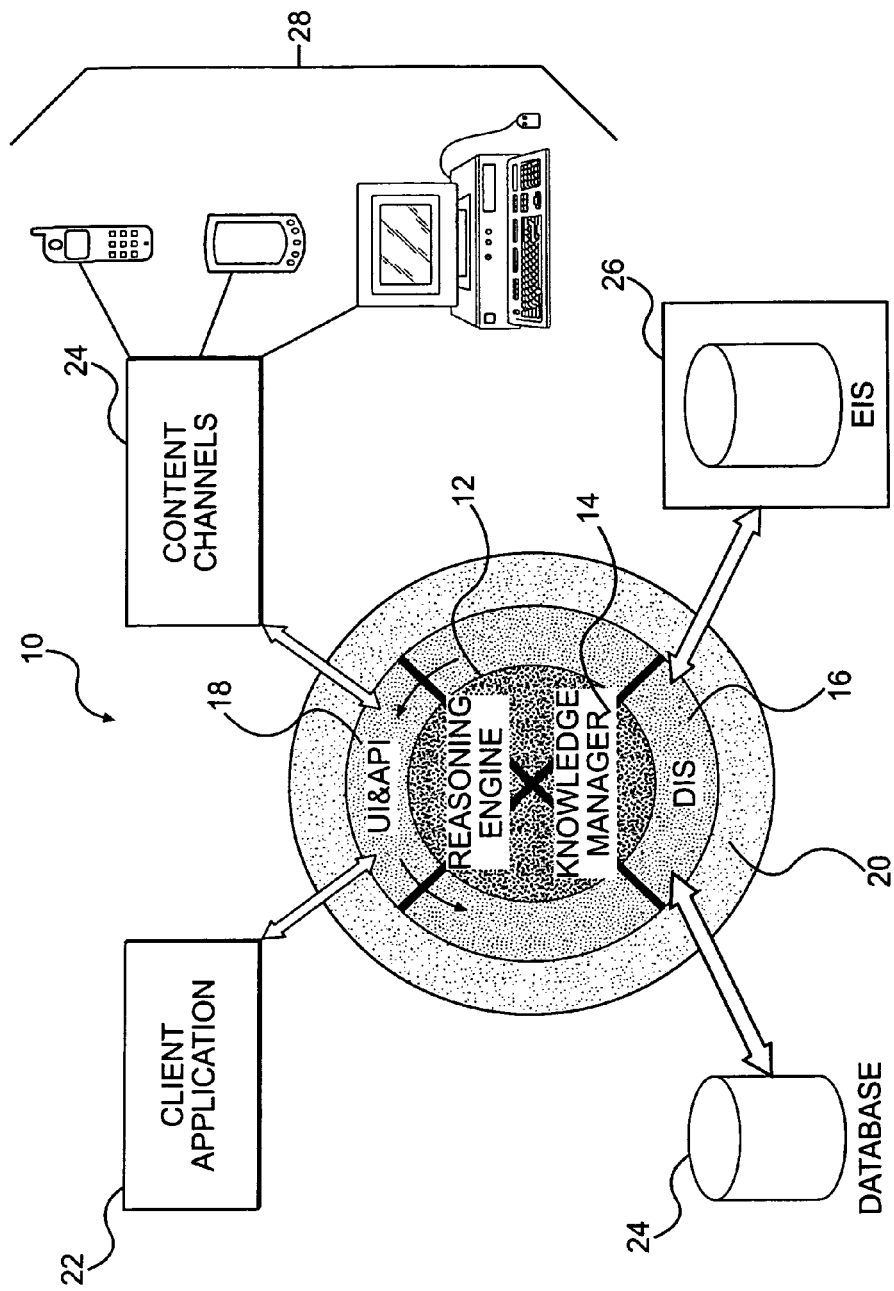
FIG. 1B is a block diagram showing the data exchange architecture of an ontology-driven information system in accordance with one embodiment of the invention.

Several exemplary embodiments of the invention will now be described in detail with reference to the accompanying drawings.

FIG. 1A is a schematic diagram 2 illustrating the functionality of an ontology-driven information system in accordance with one embodiment of the invention. As shown therein, Knowledge Broker™ ontology-driven information system 10 receives data from disparate sources including, by way of example, the World Wide Web ("the web") 3, mainframe computer 4, relational database management system (RDBMS) 5, and live wire feeds 6. Information system 10 combines the disparate data with business rules 7, which may be formulated by business managers 8, and intelligence to produce personalized product and service recommendations 9 for an end user, e.g., a customer, at the moment of interaction, i.e., in real time. Personalized product and service recommendations 9 may be transmitted to the end user via computing device 28, which is connected to a network. By way of example, computing device 28 may be a personal computer (desktop or laptop), a personal digital assistant (PDA), a handheld device, e.g., a wireless phone or other suitable wireless device having a processor and a memory. By way of example, the network connection may be to the Internet, an intranet, a WAN, a LAN, or a wireless network.

FIG. 1B is a block diagram showing the data exchange architecture of information system 10 in accordance with one embodiment of the invention. As shown therein, information system 10 includes reasoning engine 12, knowledge manager 14, distributed information service (DIS) 16, user interface (UI) and application programming interface (API) 18 (also referred to herein as the user and application interface), and Java 2 Platform Enterprise Edition (J2EE) 20. User and application interface 18 is configured to enable information system 10 to perform the functions of transforming raw data into information, transforming information into knowledge, and delivering the knowledge to the end user or taking appropriate action or actions based on the knowledge. To this end, user and application interface 18 provides the functionality by which external actors cooperate with information system 10. The external actors may be either users or applications, e.g., client application 22. The user interface is primarily targeted at interaction with users of information system 10. On the other side, the application programming interface deals with numerous inbound and outbound content channels 24, which communicate with computing devices 28. Such computing devices 28 can implement any number of communication protocols such as, for example, Internet browsers, e.g., HTTP and HTML, wireless application protocol (WAP), wireless markup language (WML), e-commerce systems (exchanges), voice interaction systems, e.g., IVR, and third party applications, e.g., J2EE™ Enterprise Java Beans (EJB) and web applications. Additional details of user and application interface 18 are set forth below with reference to FIG. 2.

Distributed information service 16 interacts with database 24, enterprise information systems (EIS) 26, and other resource managers (not shown). In one embodiment, distributed information service 16 uses J2EE specified contracts to interact with these components. In one embodiment, database 24 includes one or more relational database management systems (RDBMS). Additional details of distributed information service 16 are set forth below with reference to FIG. 6.

Figure 2:
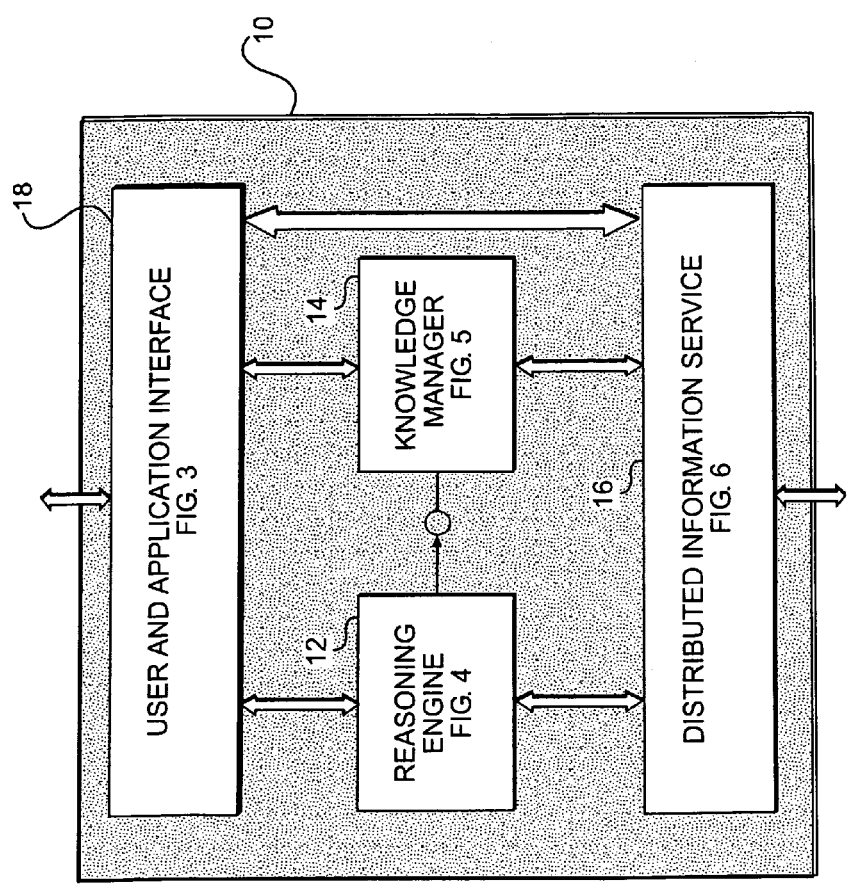
FIG. 2 is a block diagram showing the major submodules of an information system in accordance with one embodiment of the invention.

FIG. 2 is a block diagram showing the major submodules of information system 10 in accordance with one embodiment of the invention. These submodules include reasoning engine 12, knowledge manager 14, distributed information service 16, and user and application interface 18, which is described in detail below with reference to FIG. 3. Reasoning engine 12 provides the functionality that is required to process business rules, process constraints, and execute processes. To this end, reasoning engine 12 derives a set of conclusions that are entailed by a given set of premises (and facts) and executes actions that are attached to the conclusions, which may be either partial or complete. A variety of models are used to encode the premises. An ontology, which is described in more detail later, forms a common thread between the models used to encode the business rules, constraints and processes by expressing concepts that are used in various models, such as, for example, a rule base. Reasoning engine 12 communicates with distributed information service 16 and user and application interface 18 through architected contracts. An architected contract is a special form of interface that provides a much richer form of coupling between modules or submodules with defined roles. In addition, reasoning engine 12 uses the interfaces of knowledge manager 14. Additional details of reasoning engine 12 are set forth below with reference to FIGS. 4A and 5.

Knowledge manager 14 provides the functionality that is required to store and manipulate ontologies and other models of a domain. As part of an ontology, knowledge manager 14 maintains concepts and relationships to construct business rules, constraints, and processes. Business models use these rules, constraints, and processes to capture knowledge about a specific business domain. This knowledge may be used to reason about the domain and to derive actions to achieve stated goals. The use of concepts and relationships provides a higher abstraction on which business models can be built. This is advantageous because it enables the business models to be built more efficiently and to be managed more easily. Knowledge manager 14 communicates with distributed information system 16 and user and application interface through architected contracts. Additional details of knowledge manager 14 are set forth below with reference to FIGS. 4B and 5.

Distributed information service 16 provides the functionality that is required to access heterogeneous, distributed data sources. More particularly, distributed information service 16 is a collection of services that shield other modules of information system 10, as well as external applications, from the details of accessing disparate information resources. Thus, distributed information service 16 provides a uniform and simple way to access these information resources. Each information resource may be accessed via a Uniform Resource Identifier (URI), which is a logical name that hides the location and the access protocol from the resource consumer. Furthermore, transaction and security management is handled outside the application. Distributed information service 16 manages a repository of information about the resource and uses that information to locate the external resource manager, to establish a connection with the resource manager, and to interact with the resource manager to, e.g., store and retrieve data. This augmentation information also is used to translate the external data into a uniform format that can be processed by client applications as well as various presentation channels. Distributed information service 16 communicates with reasoning engine 12, knowledge manager 14, and user and application interface 18 through architected contracts. Additional details of distributed information service 16 are set forth below with reference to FIG. 6.

Figure 3:
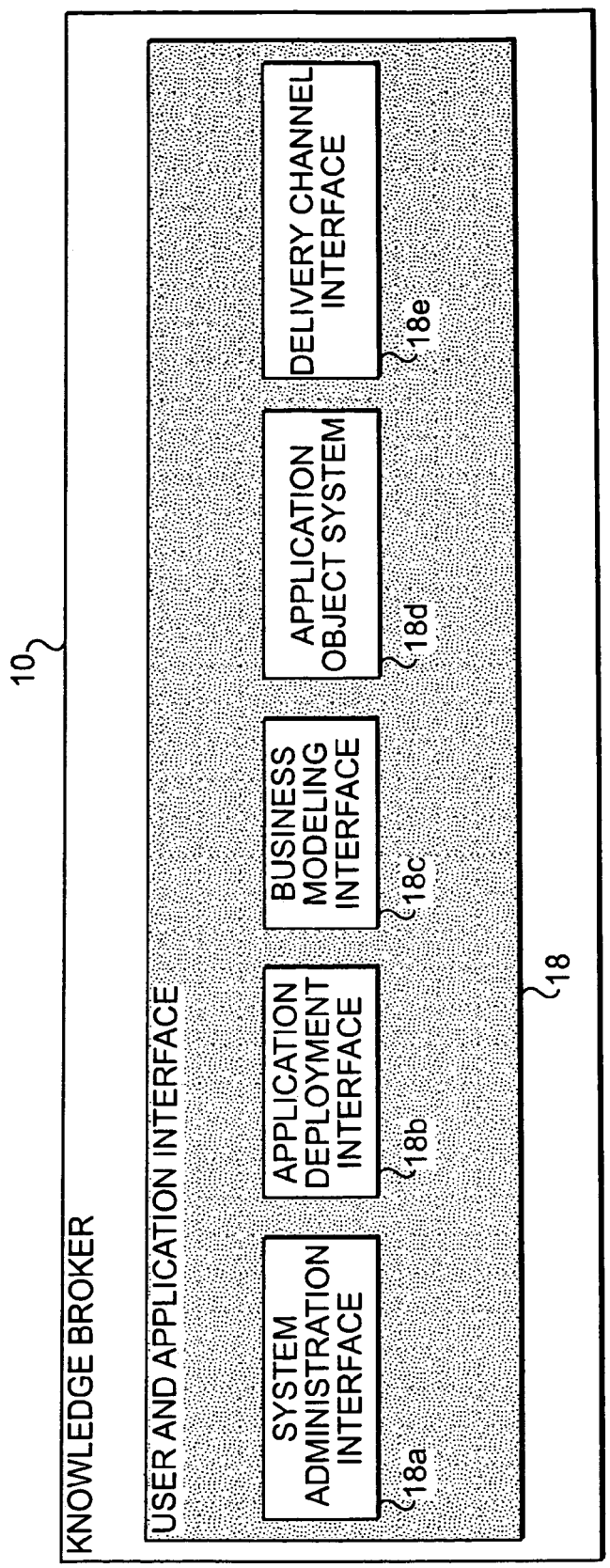
FIG. 3 is a block diagram showing the submodules of a user and application interface in accordance with one embodiment of the invention.

FIG. 3 is a block diagram showing the submodules of user and application interface 18 in accordance with one embodiment of the invention. As shown therein, user and application interface 18 includes system administration interface 18a, application deployment interface 18b, business modeling interface 18c, application object system 18d, and delivery channel interface 18e. The first three submodules, i.e., submodules 18a-18c, are used primarily during design, deployment, and setup of a solution, whereas the latter two submodules, i.e., submodules 18d and 18e, are used primarily at runtime.

In one embodiment, the architecture of user and application interface 18 is based on three technologies: Java Components, XML-based access protocols, and Business Model Languages. Java Components are Java objects that offer an interface to call methods, which implement or make accessible the functionality provided by information system 10. These components may be implemented using EJB, which is the standard component model for Java. Suitable XML-based access protocols include, but are not limited to, 1) HTTP with HTML or a specific XML content format, and 2) JMS with specific XML content format. The Business Model Languages deal with the capturing of knowledge that is entered into the system by a business user. This component of user and application interface 18 is concerned with representing the business rules, processes, and constraints that form a model of the business.

User and application interface 18 provides components to access services that are implemented in other modules, e.g., the distributed information service. The intrinsic functionality of user and application interface 18 also may be accessed via components. As used in connection with the description of the invention, the term "component" refers to an object that provides access to data or logic or assembles data or logic. Thus, the data or logic need not be implemented by the component. Generally speaking, it must be possible to access the components through a remote client. By way of example, this remote client may be a browser or another application. To this end, the interface components may be implemented as EJB components. These components, which provide access for multiple remote clients where each client is isolated from the activity of other clients, encapsulate the state of a client session. In one embodiment, the intrinsic functionality of user and application interface 18 is abstracted by a set of commands. These commands may be accessed via a component or a command language interpreter.

System administration interface 18a contains commands to configure the resource environment and to monitor running services. As such, system administration interface 18a provides the functionality that is required to let a user enter resource naming and location information. Each information collection that can be retrieved from information system 10 can be specified using a Uniform Resource Identifier (URI), which is mapped and located by distributed information system 16, as described in more detail below. Table 1 illustrates exemplary commands contained in system administration interface 18a.

TABLE 1

Naming context

Add
Remove
Show (show the attributes and relationships of a naming context)
Resource Connector Add (add a connector, e.g., Oracle JDBC driver)
Remove
Show (show the attributes and relationships of a connector)
Entity Resource Add (create an entity that represents an information collection)
Remove
Show (show the attributes and relationships of an entity)
Logging Start
Stop Application deployment interface 18b is the process that configures a specific application for its runtime environment. Table 2 illustrates exemplary commands contained in application deployment interface 18b in accordance with one embodiment of the invention.

TABLE 2

Data Source

Add
Remove
Verify (test if a connection can be established)
Show (retrieve attributes of a data source)
Find
External Schema Extract (import the schema from a given external data source)
Create (create a schema in a given external data source)
Verify (test whether a given schema is equal to the schema of a given data source)
Show (retrieve the objects that are part of the schema (type definitions, elements, attributes)
Find
Application Schema Add (create a schema)
Remove
Derive (create an application schema based on an External Schema)
Show (show the attributes and relationships of an application schema)
Map (various mapping functions)
Find Business modeling interface 18c is concerned with the creation and management of business models. By way of example, business models include rule bases and business process flows. Business modeling interface 18c serves as the entry point into information system 10 for business personnel, e.g., business line or marketing campaign managers, and provides the functionality that is required to enable these users to enter business rules, constraints, and processes. In one embodiment, business modeling interface 18c implements the abstract commands shown in Table 3.

TABLE 3

Ontology

Open
Close
Merge
Concept Hierarchy

Add concept
Remove concept
Relationship

Add
Remove
Rule Base

Open
Add Rule
Remove Rule
Interaction Flow

Add Interaction
Remove Interaction
Add Event
Remove Event
Add Task
Remove Task

Application object system 18d allows an application to interface with information system 10 using Java objects of the modeled domain. Information system 10 uses the application schema to construct these objects. Application object system also is used to integrate information system 10 with tools that support or automate the process of building a graphical representation, e.g., a user interface. The objects that are constructed represent a model of the domain. This model can be used in Model-View-Controller type user interfaces. The model includes objects that are defined in an application schema, e.g., objects such as Customer, Product, or Offer. The objects of the domain model preferably comply with the Java Beans specification. This allows information system 10 to use standard tools to build views and controllers corresponding to the object model. In this manner, application object system 18*d* transforms the generic representation of information items into a typed object system.

Delivery channel interface 18*e* provides access to the services provided by information system 10 via communication protocols. This submodule also is concerned with the preparation of the content for display or further processing by a remote client. Delivery channel interface 18*e* serves as the entry point into information system 10 for end users and provides the functionality that is required to deliver the personalized product and service recommendations. One function of delivery channel interface 18*e* is to provide mechanisms to extract information from information system 10 in a generic form. These mechanisms stand in contrast with application object system 18*d*, which represents domain objects as strictly typed Java Beans.

Delivery channel interface 18*e* also enables the exchange of XML data with the information system environment. Thus, any software system, e.g., middleware, that is able to process XML-structured data and supports one of the channel protocols can communicate with information system 10. Every information set that can be retrieved from information system 10 can be specified using a Uniform Resource Identifier (URI). In contrast with Uniform Resource Locators (URLs), a URI does not encode the location of the resource. Information system 10 maintains a repository of resource references and locates the resources based on the URI. As will be described in more detail below, a URI is mapped and located by distributed information service 16.

As noted above, information system 10 supports a number of communication protocols. Delivery channel interface 18*e* allows further protocols to be added. In one embodiment, the HTTP/HTTPS protocol family with the following content formats is supported initially: SOAP (Simple Object Access Protocol); WML (Wireless Markup Language); and HTML (the World Wide Web protocol). All of these protocols use some specific form of XML as the data content format. Delivery channel interface 18*e* also provides components that encapsulate particular services of information system 10. These components, which belong to a special system domain, are used to access information and recommendations from generic applications. They do not implement the functionality but rather delegate the requests to the specific modules. Examples of such components include the interaction flow engine and the distributed information service, both of which are described in detail below.

Figure 4A:
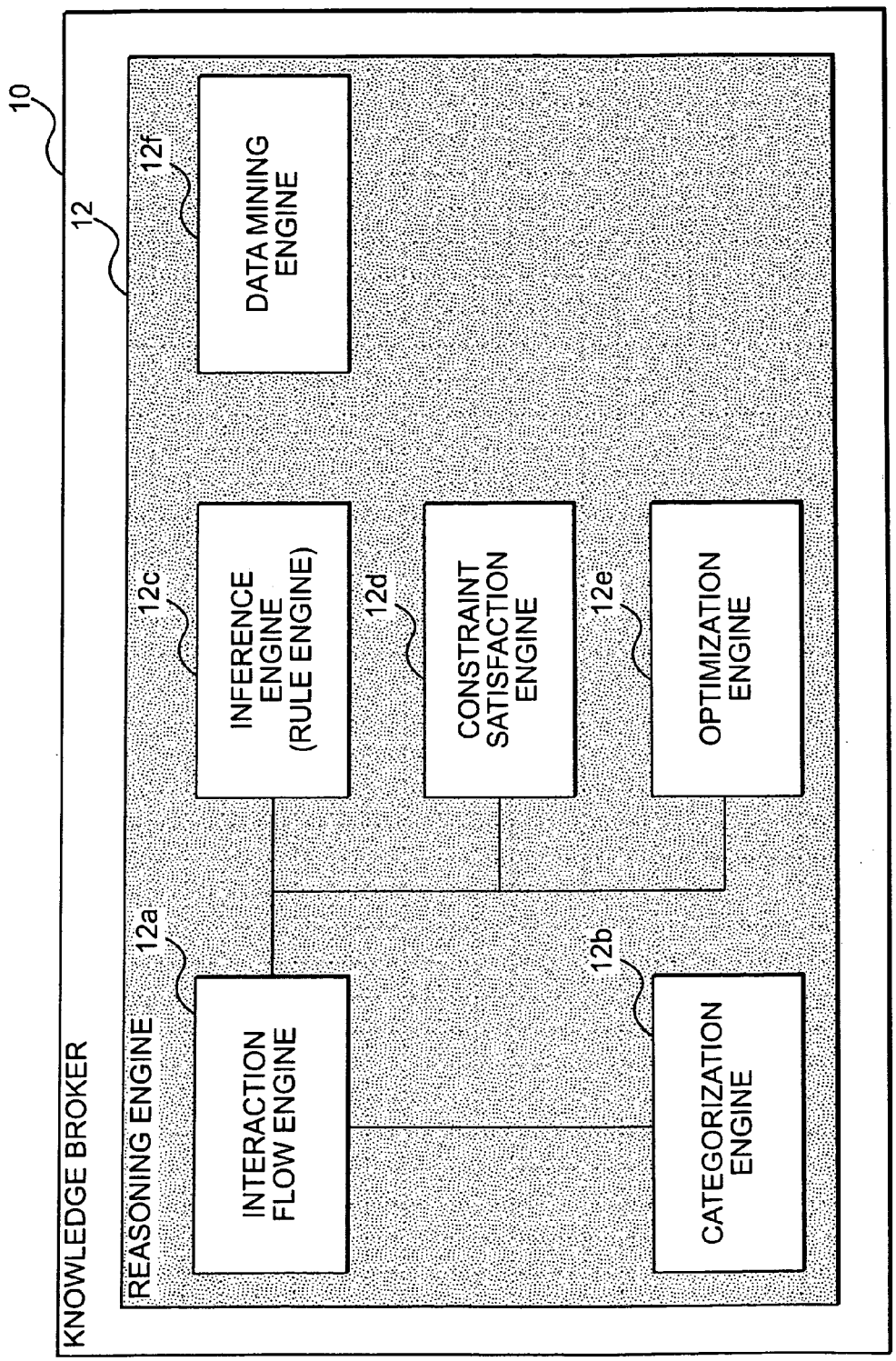
FIG. 4A is a block diagram showing the submodules of a reasoning engine in accordance with one embodiment of the invention.

FIG. 4A is a block diagram showing the submodules of reasoning engine 12 in accordance with one embodiment of the invention. As shown therein, reasoning engine 12 includes interaction flow engine 12*a*, categorization engine 12*b*, inference engine 12*c*, constraint satisfaction engine 12*d*, optimization engine 12*e*, and data mining engine 12*f*. As stated above, reasoning engine 12 provides the functionality that is required to process business rules, constraints, and processes. In this context, "processes" refers to business interactions with external users and systems. As such, reasoning engine 12 is the processing core of information system 10. Interaction flow engine 12*a* drives the reasoning process and uses specialized engines, which may be called from the interaction flow engine, to extend its capability to interpret models. Each of specialized engines 12*b*-12*f* interprets a partial model of the overall model. Interaction flow engine 12*a* also provides hooks to call out to engines other than those shown in FIG. 4A. Thus, the number and type of engines that may be used in information system 10 is not limited to the engines shown in FIG. 4A.

In one embodiment, each engine that is part of reasoning engine 12 acts upon its own model. As used herein, a "model" is a representation of an aspect of the business domain. The engine and the models are tuned to one another, thereby providing an efficient way to describe a part of the business domain and to perform efficient reasoning on the model. As used herein, "reasoning" refers to the process of reaching conclusions based on a formal representation of the domain, e.g., a model, and an inference procedure. Reasoning engine 12 reacts to changes in the information system environment by use of user and application interface 18 and the distributed information service 16. These modules act as the sensors and actors to the outside world. When acting in the capacity of sensors, these modules deliver events and thereby cause the invocation of reasoning engine 12 and, more particularly, interaction flow engine 12*a*.

Interaction flow engine 12*a* provides the functionality that is required to coordinate the usage of external data, ontologies, business rules, business constraints, and optimization parameters. As indicated above, interaction flow engine 12*a* invokes specialized engines that are able to interpret specialized models. In a given business context, interaction flow engine 12*a* generates a set of candidate recommendations, e.g., goods, services, or information, based on a customer profile and a set of business rules and constraints. The customer profile may reflect the customer's interests and the business rules and constraints may reflect the business' expertise and goals. Interaction flow engine 12*a* then prescribes the collection of feedback at the time when the interaction happens. Interaction flow engine 12*a* may further specify that the recommendations be optimized based on the feedback and other contextual information, the optimization models, and further business rules. It will be apparent to those skilled in the art that, because the process flow is model driven, other business interactions may be specified easily.

Interaction flow engine 12*a* uses an interaction model to drive the recommendation process. This interaction model is described in more detail below (see the description of interaction flow model 14*a* set forth below with reference to FIG. 4B). Interaction flow engine 12*a* communicates with distributed information service 16 through an architected contract. In particular, interaction flow engine 12*a* invokes methods of arbitrary Java objects. These Java objects are located using the services of distributed information service 16. Furthermore, interaction flow engine 12*a* uses the interfaces of inference engine 12*c*, constraint satisfaction engine 12*d*, and optimization engine 12*e*.

Interaction flow engine 12*a* is responsible for initiating actions based on the precepts of the environment. The general execution principle is as follows:

1. Identify which situation of the situations specified in the interaction flow model is most appropriately reflecting the real world. To do this, interaction flow engine 12*a* invokes categorization engine 12*b*, which, as described in more detail below, classifies events and other available and relevant information (e.g., user input and information stored in a database).

2. Categorization engine 12*b* determines a set of categories for events that have occurred. A preceding situation that has been dealt with is an event. Further, the categorization engine 12*b* determines a set of categories for information entities that are stored in a database and that are relevant for classifying a situation.

3. Based on the categorized events and categorized input data, a situation action is selected and the associated actions are executed. The actions may be the interpretation of a model (one of the built-in actions) or the execution of a method of an object. Model-related actions include, for example, infer, search with constraints, interact, optimize, decide, etc. A situation can describe multiple alternatives and loops. The "decide" action describes a branch in the flow.

4. After the situation is dealt with, i.e., the termination state is reached, the completion of the situation is recorded as an event.

Step 1) is similar to identifying the state in a classic workflow engine. The process of situation identification is, however, more powerful than simple state-transition models because it takes into consideration that the flow is interrupted after a situation is dealt with. Even if the situation prescribes the transition into a follow-up situation, as states do when the transition into a new state is made, the new situation does not occur unconditionally. It also is not deterministic when the following situation occurs. Often it depends on when and what feedback the user provides. Interaction flow model 14a (see FIG. 4B) may specify the usage of another model, e.g., a rule base, to evaluate what situation most appropriately reflects the real world situation.

Interaction flow engine 12a uses distributed information service 16 (see FIG. 2) to locate a Java object that is an information resource. Interaction flow engine 12a need only provide a Uniform Resource Identifier (URI) to distributed information service 16 to locate the Java object. Distributed information service 16 manages the additional information that is needed to look up the desired object and does the lookup for interaction flow engine 12a.

Categorization engine 12b provides the functionality that is required to categorize objects, which can be information entities or events. An information entity may be stored in an external system or sent to information system 10 using one of the interfaces. Events may be created in storage systems or an application, or may be delivered via one of the channel interfaces. During categorization, all concepts of which that object is an instance are determined. Categorization engine 12b uses the properties and relationships of a concept to test the membership. The properties and relationships of a concept are defined in conceptual model 14c, which is described in more detail below with reference to FIG. 4B. Categorization engine 12b may use a number of techniques to perform classification, which include, but are not limited to, property value testing, exemplar approximation, and probabilistic techniques. Categorization engine 12b may receive requests for categorizations from interaction flow engine 12a and inference engine 12c. In addition, categorization engine 12b uses the interfaces of conceptual model 14c (see FIG. 4B).

Inference engine 12c, which also may be referred to as a rule engine, provides the functionality that is required to perform logical inference. "Logical inference," which is sometimes referred to as deduction, is the process of deriving conclusions that are entailed in a set of rules and a set of facts known to be true. A "rule" is a pair of premise or antecedent and conclusion or consequent. A set of rules, e.g., a rule base, is compiled into an efficient form for execution by inference engine 12c. During logical inference, the entailment relation over a set of rules and a set of facts is computed. The inferred knowledge is useful only if it helps to take actions. The actions may be taken by interaction flow engine 12a, which uses the inferred statement. Inference engine 12c uses the interfaces of rule base 14d, which is described in more detail below with reference to FIG. 4B.

Constraint satisfaction engine 12d provides the functionality that is required to search for states in the state space that satisfy a number of constraints and the goal test. Thus, constraint satisfaction is a modified search problem and constraint satisfaction engine 12d is a special kind of search engine. In this context, states are instances of concepts. Constraints can be either absolute or preferences. Violation of an absolute constraint rules out a potential solution. In the case of preferences, one solution is preferred over another. Constraints may be dynamically inferred by inference engine 12c or taken from a profile or constraint base, which is managed in constraint model 14e (see the description of constraint model 14e set forth below with reference to FIG. 4B). A set of constraints, e.g., a constraint base, is compiled into an efficient form for execution by constraint satisfaction engine 12d. Furthermore, constraint satisfaction engine 12d uses the interfaces of inference engine 12c, constraint model 14e (see FIG. 4B), and query service 16e (see FIG. 6).

An example of a constraint satisfaction problem is the search for products that match certain criteria. In this case, the inference engine is invoked first and the inferred concepts and constraints are taken and passed to the constraint satisfaction engine. The inference engine does not search for instances of the concepts. Rather, the inference results are interpreted as constraints by the constraint satisfaction engine. The constraint satisfaction engine now combines the constraints with a search strategy to come up with appropriate instances. The instances may be particular objects such as goods, services, and information. In many cases, the constraint satisfaction engine may reformulate the constraints into a query that is passed on to the query service in the distributed information service.

Optimization engine 12e provides the functionality that is required to find an optimal solution among a number of candidate solutions. Optimization engine 12e is used when a problem may be solved by selecting a solution that is optimal with respect to an optimization criterion. This typically requires that a metric exist. Finding a solution, e.g., a set of products to recommend, by optimization usually leads to more accurate results than simple constraint-bound searching. Optimization engine 12e communicates with distributed information service 16 through an architected contract. The model may be stored in a persistent storage and may be read and modified using distributed information service 16. Furthermore, optimization engine 12e uses the interfaces of ontology 14b, which is described in more detail below with reference to FIG. 4B. The meaning of the terms that are used in an optimization model is defined via the ontology and this knowledge may be used in interpreting the model.

Data mining engine 12f provides the functionality that is required to analyze the correlation in data and to build a predictive model from that correlation. Stated differently, data mining engine 12f implements the functionality to build predictive models. A "predictive model" takes the properties of an instance or a set of instances and produces the value of another property or relationship that is not stored in the external storage systems. By way of example, representative predictions include a person's tax bracket based on income, marital status, and number of children and a person's behavioral cluster based on previous purchases. Data mining engine 12f communicates with distributed information service 16 through an architected contract.

Figure 4B:
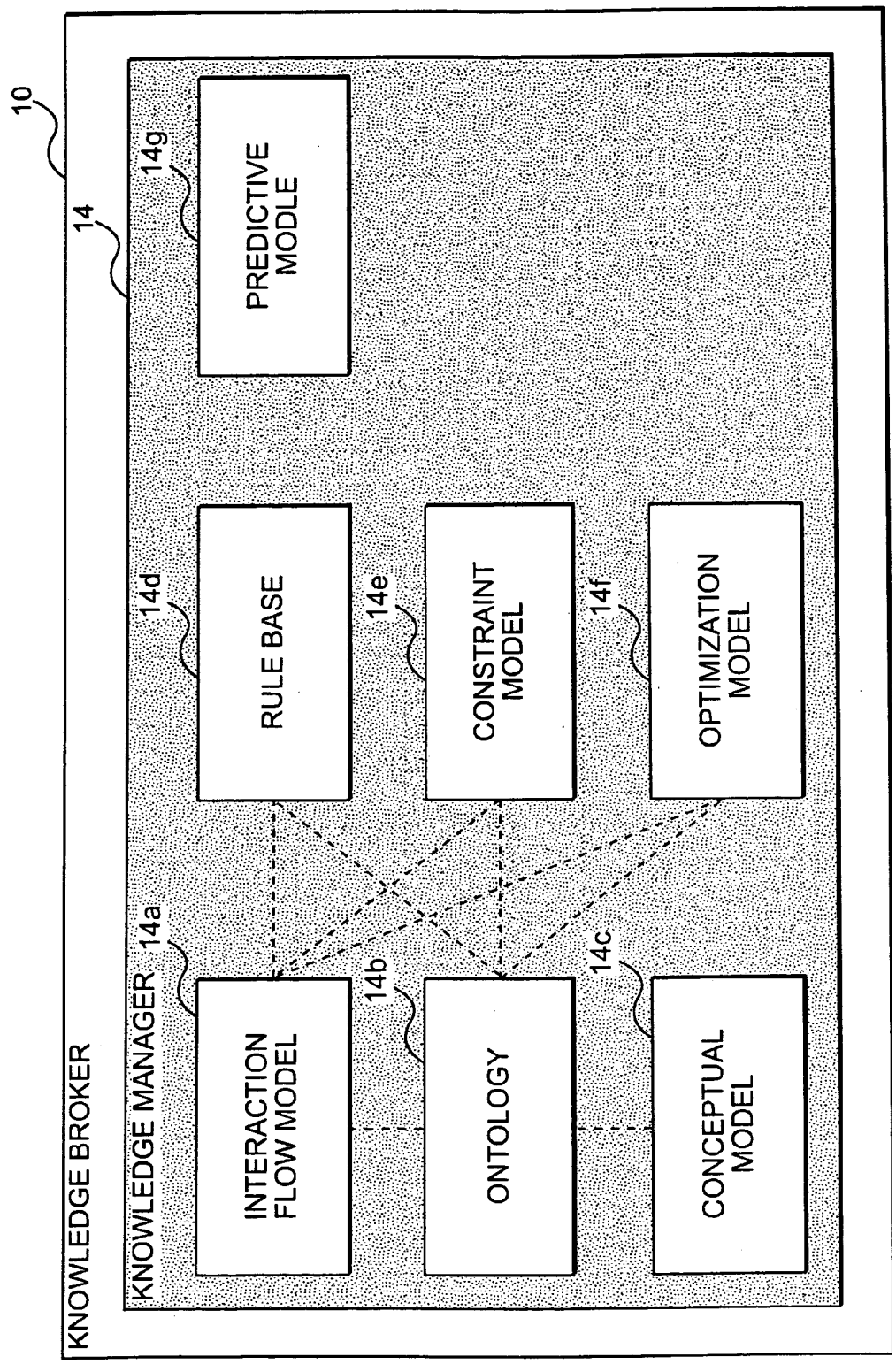
FIG. 4B is a block diagram showing the submodules of a knowledge manager in accordance with one embodiment of the invention.

FIG. 4B is a block diagram showing the submodules of knowledge manager 14 in accordance with one embodiment of the invention. As shown therein, knowledge manager 14 includes interaction flow model 14a, ontology 14b, conceptual model 14c, rule base 14d, constraint model 14e, optimization model 14*f*, and predictive model 14*g*. Knowledge manager 14 is the repository for business models, which altogether model situations that occur in complex, real-world, commercial processes and involve decision making to achieve a goal state. One important aspect of the business models is that a software program can derive reasonable actions from such models. Deriving reasonable actions is a special form of reasoning that results in the selection and execution of one or more actions. Many aspects contribute to the business models. The foundation of each model is a conceptual representation of certain things as they exist or are true in a given domain (propositions). Such a conceptual model is referred to herein as an ontology. The use of an ontology advantageously ensures consistency between different models. To this end, different models that describe aspects of a particular domain may share a common ontology.

An ontology managed by information system 10 typically contains multiple concepts and relationships between concepts. The complexity of a business domain is captured mainly in the relationships between concepts because a concept alone is usually too simplistic to be helpful. In contrast, relationships between concepts are potentially very rich. A few fundamental relationships between concepts are found in many ontologies. These fundamental relationships are meronymy, hypernomy, and synonymy. Meronymy is defined between a whole concept and its partial concepts and is called the HAS_A relationship. Hypernomy is defined between a concept and its subconcepts and is called the IS_A relationship. Synonymy exists within a number of terms referring to a concept if one can be used for the other and the meaning would be the same relative to a specified context.

Interaction flow model 14*a* manages multiple interaction flow models, that is it performs operations such as creation, reading, modification, and deletion with these models. An interaction flow includes a number of situations. Each situation has a context description that contains the event concepts that a situation requires in order to occur. An interaction flow is compiled into an efficient form for execution by interaction flow engine 12*a* (see FIG. 4A). Interaction flow model 14*a* communicates with distributed information service 16 through an architected contract. The model may be stored in a persistent storage and may be read and modified using distributed information service 16. Furthermore, interaction flow model uses the interfaces of ontology 14*b*. In particular, the meaning of the terms that are used in interaction flow model 14*a* is defined via ontology 14*b*. This knowledge may be used in interpreting the model.

Ontology 14*b* of information system 10 serves as the common thread between all other models. For this reason, information system 10 is therefore an ontology-driven information system. In a more general sense, but still in the context of the information system described herein, an ontology helps to formulate and relate various other knowledge representation models, which usually are based on first order logic or interaction flow. Concrete models typically use a vocabulary. The vocabulary may be made up of words and word phrases of the particular domain. To relate different models, a commitment to the meaning of the vocabulary is needed. If, for instance, one model makes propositions about a "conservative investor," then another model can refer to the same concept and assume the same intention for the concept. Ontology 14*b* is linked to all of the other models by terms that are used in those models and that are defined in the ontology. Ontology 14*b* communicates with distributed information service 16 through an architected contract.

Each knowledge representation model refers to a conceptualization of the domain. A "conceptualization" is a model that represents the domain as concepts. A "concept" is an abstraction for a set of things. The set also may be called a category or class. The process of assigning a thing to a category is called categorization or classification. A conceptualization gathers relationships between concepts, especially the relationships between concepts and their properties, which also can be concepts. Those skilled in the art will appreciate that concepts exist independently of the words that are used to denote the concepts. For instance, the concept to which the English noun "bench" refers exists independently of the existence of the English language. Indeed, in the German language the noun "bank" is used to refer to this concept. However, the English noun "bank" refers to a different concept.

Humans categorize concrete objects of the world as instances of concepts. Concepts are very useful for expressing knowledge so that it is understood by computer-based interpreters. Here, "understanding" refers to the derivation of conclusions and actions. Humans use concepts to cope with the limitations of the human memory. The knowledge that humans have about even simple concepts is huge and differs from person to person. A conceptualization allows humans to reason about the knowledge without having to process the associated knowledge completely. Often it is perfectly reasonable to categorize an object and reason about it using the concept. The irrelevant properties of that instance are simply ignored. Thus, there are two basic operations in which a conceptualization is used: categorization of an object and inference using the concept.

An ontology relates a modeling language to a conceptualization. The relation is indirect because the ontology specifies the intended meaning of a vocabulary in the modeling language. If the vocabulary is used in these models, then the models commit themselves to that meaning. This commitment restricts the models that can be expressed using that modeling language. It also means that different models enter a mutual commitment via the ontology. The various models agree with the meaning of the terms that they use and will not contradict the meaning that is formulated in the conceptualization. The models can and will add more knowledge around the concepts but they do not redefine the terms. For those models, the terms have an inner structure that is solely defined outside of the model. The model would otherwise treat the terms as atoms.

An ontology is very closely related to, but not the same as, a conceptualization. Two different ontologies can be linked to the same conceptualization. For instance, take the conceptualization of "mortgages" plus an ontology that uses French terms and another that uses English terms. Using an ontology in a modeling language is essentially the same as declaring publicly that the terms of the vocabulary refer unambiguously to particular concepts of the conceptualization. Although a conceptualization may have more than one or no ontology, an ontology is practically useless without a conceptualization.

Conceptual model 14*c* manages the creation, modification, and deletion of concepts, which form the basis of a conceptual model. A "concept" is represented by a set of properties and relationships. The concept may be named using the ontology. In fact, a concept may have different names in different ontologies. Conceptual model 14*c* communicates with distributed information service 16 through an architected contract. The model may be stored in a persistent storage and may be read and modified using distributed information service 16.

Rule base 14*d* manages multiple rule bases. A "rule base" is a set of rules that are used together during inference. As described above, a set of rules is compiled into an efficient form for execution by inference engine 12*c* (see FIG. 4A).

Rule base 14d is invoked by inference engine 12c, which executes the search inference process. Inference engine 12c is invoked by interaction flow engine 12a, which drives the entire reasoning process. Rule base 14d communicates with distributed information service 16 through an architected contract. The rule base may be stored in a persistent storage and may be read and modified using distributed information service 16. Furthermore, rule base 14d uses the interfaces of ontology 14b. The meaning of the terms that are used in the rule base may be defined via the ontology. This knowledge may be used in interpreting the rules during the inference process.

Constraint model 14e manages multiple models that define constraints for search problems. Constraint model 14e contains the preference manager (not shown). As described above, a set of constraints, e.g., a constraint base, is compiled into an efficient form for execution by constraint satisfaction engine 12d (see FIG. 4A). Constraint model 14e is invoked by constraint satisfaction engine 12d, which executes the search process. Constraint satisfaction engine 12d is invoked by interaction flow engine 12a, which drives the entire reasoning process. A typical interaction flow involves a search for an object in external storage systems. The search criteria may be formulated during the reasoning process. Often an inference process will produce search criteria. To ensure consistency throughout the reasoning process, constraints can be formulated and stored in a constraint model. Constraints also can be preferences, in which case an implicit ordering over the search results can be expressed.

Constraints are an important factor for the outcome of recommendations. In particular, constraints are used to prevent business policies from being violated when recommendations are given. Constraints also can be used to prevent the recommendation of products, e.g., goods, services, and information, that have been rejected during a previous interaction. Constraint model 14e communicates with distributed information service 16 through an architected contract. The model may be stored in a persistent storage and may be read and modified using distributed information system 16. Furthermore, constraint model 14e uses the interfaces of ontology 14b. The meaning of the terms that are used in a constraint model may be defined via the ontology. This knowledge may be used in interpreting the model.

Optimization model 14f manages multiple models that define metrics for optimization problems. Suitable metrics include formulas and simple properties of concepts. As described above, an optimization model is compiled into an efficient form for execution by optimization engine 12e (see FIG. 4A). Optimization model 14f communicates with distributed information service 16 through an architected contract. The model may be stored in a persistent storage and may be read and modified using distributed information system 16. Furthermore, optimization model 14f uses the interfaces of ontology 14b. The meaning of the terms that are used in an optimization model may be defined via the ontology. This knowledge may be used in interpreting the model.

Predictive model 14g manages multiple models that define formulas or values found by data mining engine 12f (see FIG. 4A). A "predictive model" describes a functional dependency between one or more properties of one or more instances and a property that is not externally stored. Predictive model 14g communicates with distributed information service 16 through an architected contract. The model may be stored in a persistent storage and may be read and modified using distributed information system 16. Furthermore, predictive model 14g uses the interfaces of ontology 14b. The meaning of the terms that are used in a predictive model may be defined via the ontology. This knowledge may be used in interpreting the model.

Figure 5:
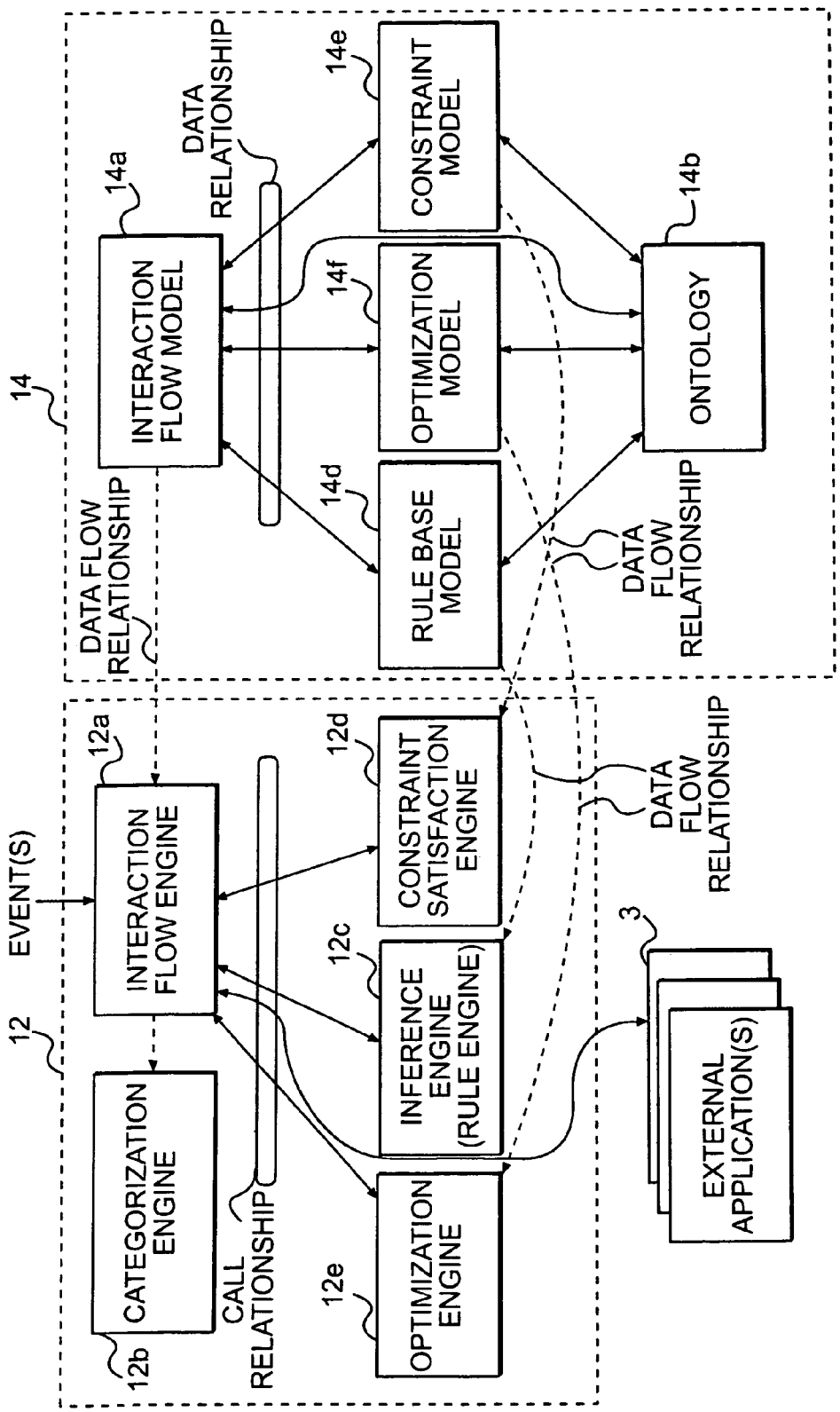
FIG. 5 is a block diagram illustrating the interaction flow between the knowledge manager and the reasoning engine in accordance with one embodiment of the invention.

FIG. 5 is a block diagram illustrating the interaction flow between knowledge manager 14 and reasoning engine 12 in accordance with one embodiment of the invention. As shown therein, interaction flow engine 12a is in communication with interaction flow model 14a, optimization engine 12e is in communication with optimization model 14f, inference engine 12c is in communication with rule base model 14d, and constraint satisfaction engine 12d is in communication with constraint model 14e. In addition, interaction flow engine 12a can communicate with other external applications 13 to execute other tasks. Ontology 14b is in communication with rule base model 14d, optimization model 14f, and constraint model 14e. In this manner, the ontology defines a common thread between the different models.

To illustrate how the components shown in FIG. 5 may interact, an exemplary situation in which reasoning engine 12 and knowledge manager 14 interact with one another to generate a recommendation in response to events will now be described. In response to an event or set of events received from the real world, interaction flow engine 12a initially triggers categorization engine 12b to determine a set of categories for the events that have occurred. In one embodiment, a preceding situation that has been dealt with also is considered an event. Based on the categorized events, a situation action is selected by searching interaction flow model 14a. In one embodiment, the selected situation action obtained from interaction flow model 14a is in the form of a task list. Thus, the task list, which may include one or more tasks, is read by interaction flow engine 12a.

In this example, the task list includes instructions to interact with each of optimization engine 12e, inference engine 12c, and constraint satisfaction engine 12d. It should be appreciated, however, that there are many scenarios in which only one of optimization engine 12e, inference engine 12c, and constraint satisfaction engine 12d is needed to execute the instructions from the task list. In other instances, interaction flow engine 12a can communicate with one or more external applications 13 (or external models) to execute the instructions from the task list. Returning now to the description of the example, the task list may require that inference engine 12c execute an inference for the situation provided by interaction flow engine 12a. Accordingly, inference engine 12c will execute an inference using rule base model 14d. Thus, the inference engine provides the functionality that is required to perform logical inference. As described herein, logical inference is the process of deriving conclusions that are entailed in a set of rules and a set of facts known to be true. A rule is a pair of premise or antecedent and conclusion or consequent. The set of rules may be compiled into an efficient form by rule base model 14d for execution by inference engine 12c.

Inference engine 12c passes the result, which is in the form of a number of constraints, to interaction flow engine 12c, which then executes the next task in the task list. In this example, the next task in the task list requires that constraint satisfaction be performed. Accordingly, interaction flow engine 12a will pass the number of constraints to constraint satisfaction engine 12d, which also receives compiled constraint model data from constraint model 14e. Constraint satisfaction engine 12d will then perform a search (i.e., execute) to identify a set of objects or solutions (e.g., a set of products or services to be recommended). The set of objects or solutions may then be communicated back to interaction flow engine 12a. In other instances, only one object or solution may be provided. If further refinement within a set of objects or solutions is set forth in the task list, then interaction flow engine 12a passes the objects or solutions to optimization engine 12e.

In this case, optimization engine 12e will also obtain compiled information from optimization model 14f to execute an optimization model, e.g., an optimization algorithm. The optimal solution may be recorded as an "event" and communicated back to interaction flow engine 12a. In other words, optimization engine 12e functions to determine a solution that is optimal with respect to the optimization model. In one embodiment, this requires that a metric exist. Finding a solution, e.g., a set of products, to recommend by optimization leads to more accurate results than simple constraint-bound searching. At this point, interaction flow engine 12a may communicate the result to the appropriate receiving module or interface, such as distributed information service (DIS) 16. By way of example, the receiving module may be a message system, the user, a display, a database, or any other type of data receiving, data storing, or data processing object. Those skilled in the art will recognize that the number and type of engines contained in reasoning engine 12 may be varied from that shown in FIG. 5. Furthermore, because the process flow is model driven, interaction flow engine 12 can interact with other business models, applications, or objects.

Figure 6:
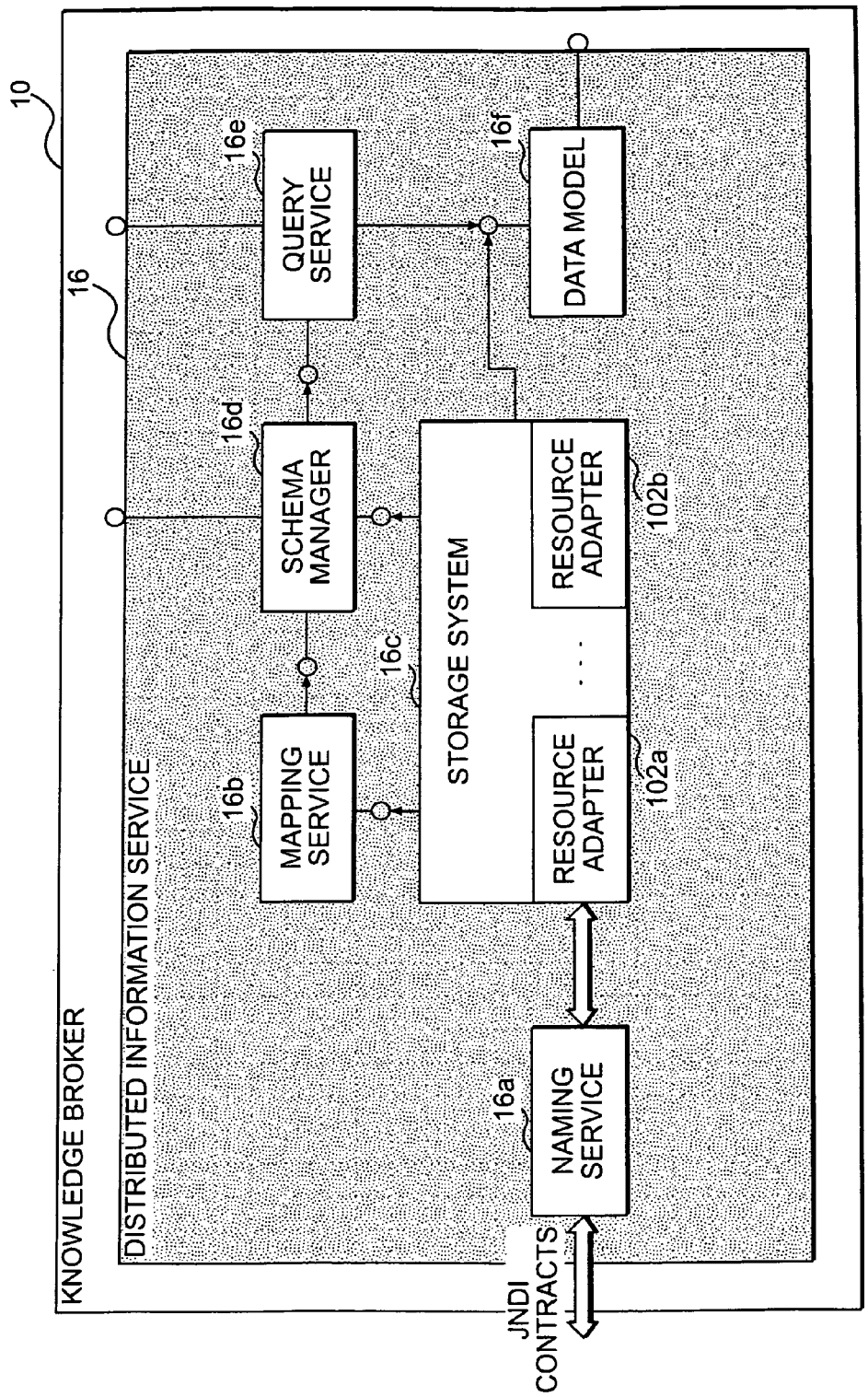
FIG. 6 is a block diagram showing the submodules of a distributed information service in accordance with one embodiment of the invention.

FIG. 6 is a block diagram showing the submodules of distributed information service 16 in accordance with one embodiment of the invention. As shown therein, distributed information service 16 includes naming service 16a, mapping service 16b, storage system 16c, schema manager 16d, query service 16e, and data model 16f. Naming service 16a provides the functionality that is needed to look up information resources. Each information resource has a Uniform Resource Identifier (URI) and naming service 16a manages a name space. Objects that are bound to the name space typically hold additional information that is required to access the represented object. The application is not concerned with providing this information and the information can be changed outside the application, even after the application is completed. Information resources may be ordinary data entities, i.e., data sets that are stored in external systems, meta data information items, e.g., schema objects, and other suitable management objects, e.g., connectors or data source objects. The implementation of the naming service is provided by the J2EE platform. The J2EE platform requires an implementation of the Java Naming and Directory Interface (JNDI), which is a standard extension of the Java platform.

Mapping service 16b provides the functionality that is required to implement aggregated objects whose attributes and relationships come from multiple physical data sources. Mapping service uses the interfaces of naming service 16a, storage system 16c, schema manager 16d (a schema may be stored in an external storage system), and data model 16f. Storage System 16c defines the abstractions that all resource adapters 102a, 102b, etc. must implement to plug into information system 10 as a data and event resource. Generally, abstractions unify different storage systems along various dimensions. More specifically, the storage system defines unification for connection management, transaction management, security management, interaction management, schema management, event management, and data structure representation.

Connection management specifies how connections to external enterprise information systems are created and pooled. Interaction management specifies how operations/statements that retrieve, create, update, and delete data in the specific storage systems are expressed and invoked. Schema management specifies how the schema information that is employed by a storage system is retrieved and manipulated. Data structure representation specifies how data structures, which have been returned from a retrieval operation, are examined and how they are provided for creation and update operations. Transaction management specifies how an application server uses a transaction manager to manage transactions across multiple resource managers. This contract also supports transactions that are managed internal to an EIS resource manager without the necessity of involving an external transaction manager. Security management enables secure access to an information resource, e.g., an RDBMS, a messaging system, or a packaged application. Additional details of storage system 16c are set forth below with reference to FIG. 7.

Schema manager 16d provides the functionality that is required to create, read, update, and delete schemas. The main purpose of the schema manager is to create application schemas. These schemas are used to communicate the guaranteed structure of information items to other modules and applications, which can programmatically explore, display, and map the structure. Schema manager 16d uses the interfaces of naming service 16a, storage system 16c, and data model 16f. Query service 16e provides the functionality that is required to execute queries that involve multiple physical data sources and schemas. Distributed information service 16 provides a uniform view on aggregated data coming from multiple heterogeneous data sources and, therefore, it is desirable to query that view as if it were a single data source. The query language should be compliant with URI notation. As described above, distribution information service 16 makes an information resource available under a URI. To find that information resource, an extended URI syntax, e.g., XPath, which allows selection of specific items along a path, may be used. Query service 16e uses the interfaces of naming service 16a, schema manager 16d, and data model 16f.

Data model 16f provides a way to communicate the structure of a data item to its users, e.g., other modules, services, and applications. Thus, the data model is a foundation that is used by many other modules. Data model 16f also makes the values of the data structure accessible via a single API. In one embodiment, the data model uses an interface approach to access the data structures. Interfaces are desirable because they carry only minimal runtime overhead and do not add unnecessary development effort, provided they are small and concise.

Data model 16f provides an abstraction for all data structures that are stored in external storage systems. The data model lends itself to the abstract data model that is behind XML documents. The basic entity is an item. Items can have attributes, which have an atomic data type (no visible internal structure). Items also can have relationships with other items. These relationships may be represented as parent-child relationships. This means that each item has at most one parent. Using this relationship, aggregation can be expressed. General associations may be modeled using reference attributes. A "reference attribute" is similar to a Java object reference. Items have names that indicate the type of an item. However, data items do not have to be strictly typed. Although an item may be an instance of a class, it nevertheless can have additional attributes and relationships. If the class defines essential attributes and relationships, then the item must have such attributes and relationships.

Figure 7:
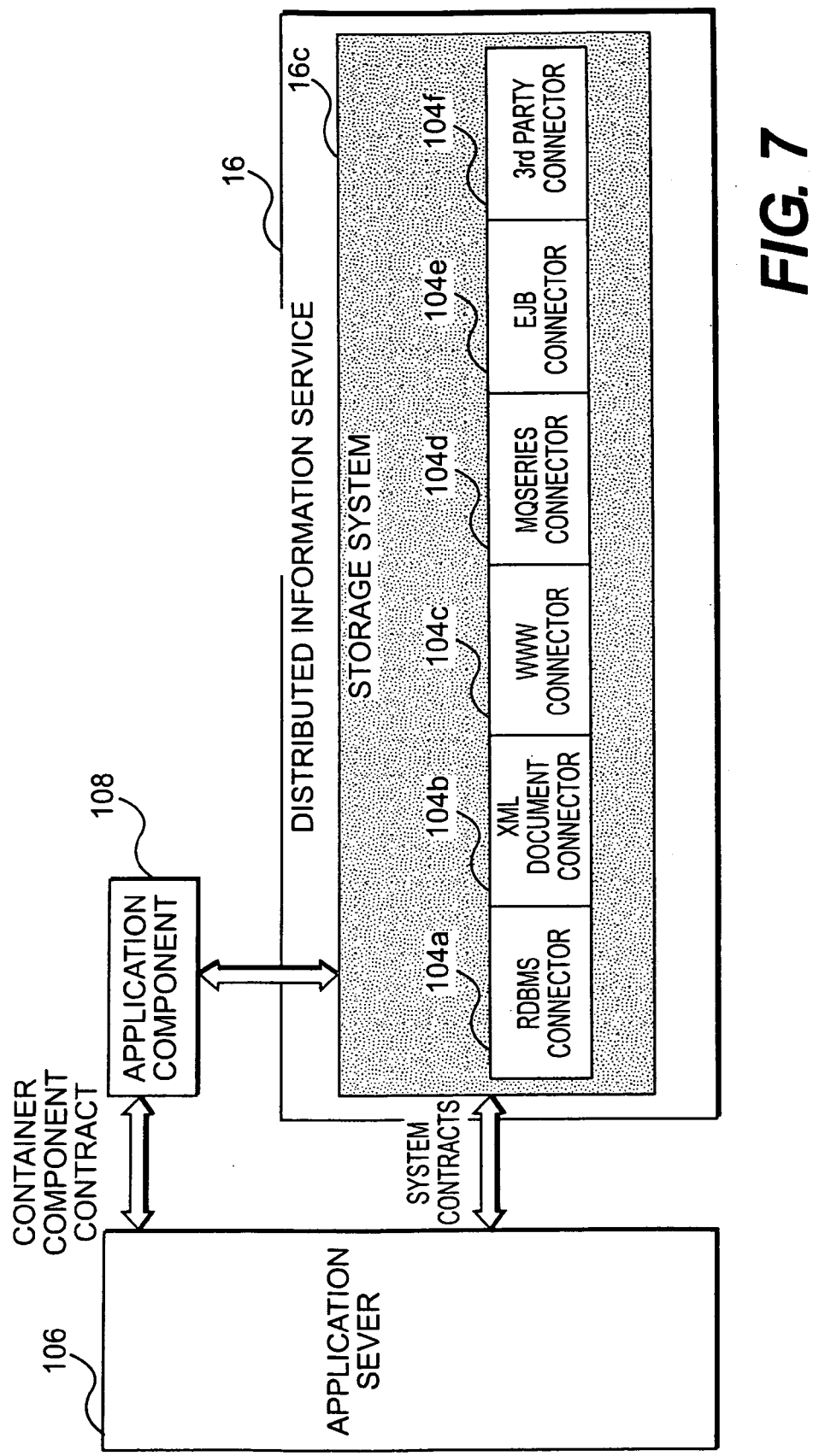
FIG. 7 is a block diagram showing additional details of storage system 16c shown in FIG. 6 in accordance with one embodiment of the invention.

FIG. 7 is a block diagram showing additional details of storage system 16c shown in FIG. 6 in accordance with one embodiment of the invention. The interactions shown in this embodiment illustrate the integration of the ontology-driven information system with the J2EE™ Connector Architecture.

As shown in FIG. 7, storage system 16c includes RDBMS connector 104a, XML document connector 104b, WWW connector 104c, MQSeries connector 104d, EJB connector 104e, and 3rd party connector 104f. Storage system 16c communicates with J2EE application server 106 through an architected contract, e.g., the contracts that may be implemented by the application server in accordance with standard J2EE connector architecture, which is available from Sun Microsystems (http://java.sun.con/j2ee/connector). Storage system 16c also communicates with application component 108, which is provided by application object system 18d of user and application interface 18 (see FIG. 3), through an architected contract. Application component 108 also communicates with J2EE application server 106 in accordance with an architected contract, e.g., a container/component contract. In addition, storage system 16c communicates with an administration component (not shown) provided by system administration interface 18a (see FIG. 3). Furthermore, storage system 16c uses the interfaces of naming service 16a, mapping service 16b, schema manager 16d, and data model 16f (see FIG. 6).

Figure 8:
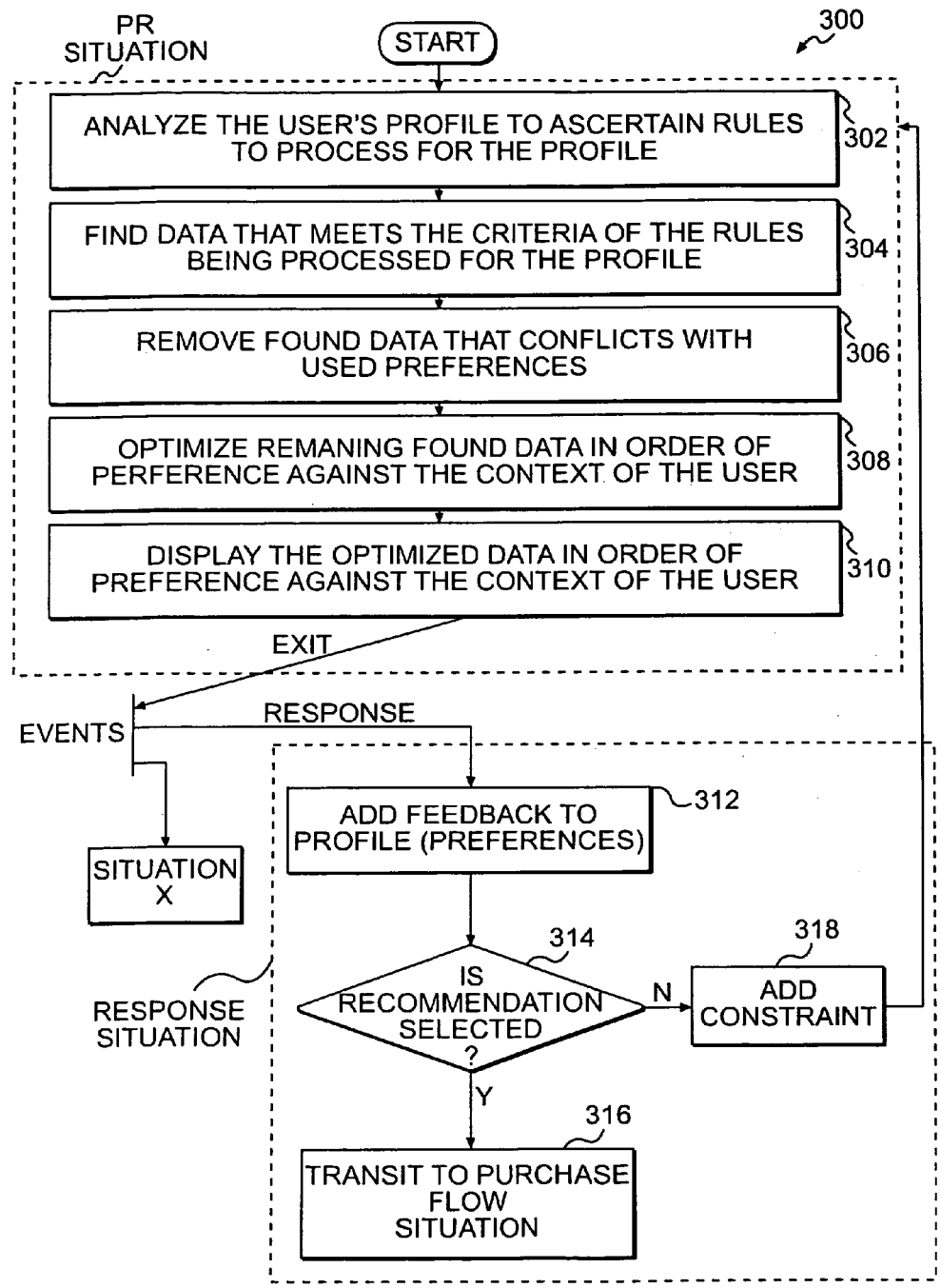
FIG. 8 is a detailed flowchart diagram illustrating the method operations performed in generating a recommendation for a user in accordance with one embodiment of the invention.

FIG. 8 is a detailed flowchart diagram 300 illustrating the method operations performed in generating a recommendation for a user in accordance with one embodiment of the invention. The method begins in operation 302 in which the user's profile is analyzed to ascertain rules to process for the profile. In one embodiment, operation 302 may be implemented by classifying the user upon logging in to an ontology-driven information system and displaying an interface that prompts the user as to whether a recommendation is desired. By way of example, the user may be a customer or a corporate user, e.g., a stockbroker. In one embodiment, operation 302 ascertains the rules to process by first determining the concepts associated with the user profile, and then determining the rules associated with those concepts.

The method proceeds to operation 304 in which data that meets the criteria of the rules being processed for the profile is found and retrieved. As described above, the rules are expressed in terms of generalized concepts, which may have different meanings in different contexts. The data that is found and retrieved in operation 304 includes the specific instances of the generalized concepts that apply to the context of the user. Next, in operation 306, found data that conflicts with the user's preferences is removed. The method then proceeds to operation 308 in which the remaining found data is optimized in order of preference against the context of the user. This optimization operation may be implemented using an appropriate optimization algorithm. In one exemplary embodiment of the invention in which investment recommendations are generated, the Markowitz optimization algorithm may be used. The optimization algorithm generates a set of products or services that optimizes the remaining found data relative to a goal test, which may be defined by the user.

Once the optimized data has been generated, the method proceeds to operation 310 in which the optimized data, e.g., a product recommendation, is displayed to the user. If desired, the optimized data may be displayed to the user together with the reason for the selection and the ranking. Operations 302-310 collectively comprise a product recommendation (PR) situation. Once the product recommendation or other optimized data is displayed in operation 310, the product recommendation situation has reached its terminated state and the method waits for an event to occur before any further action is taken. If the user fails to respond within a predetermined period of time, then an "exit" event is deemed to occur and this exit event is recorded. If the user responds, then a "response" event is deemed to occur and the method proceeds to operations 312-318, which collectively comprise a response situation.

In operation 312, the feedback from the response is added to the user's profile. Next, in decision operation 314, it is determined whether the product recommendation is selected. If the recommendation is selected, then the method proceeds to operation 316 in which the response situation has reached its terminated state and the method transits to a purchase flow situation. On the other hand, if the product recommendation is not selected, then the method proceeds to operation 318 in which a constraint is added to the user's profile. This constraint is added to the user's profile to avoid providing the user with the same recommendation that was just rejected. Once the constraint is added to the user's profile, the method may cycle back up and wait for another product recommendation situation to arise.

In addition to the product recommendation situation and the response situation described above, another situation, which is labeled as situation X in FIG. 8, may occur. In particular, situation X may occur when external events indicate that the product recommendation made to the user is no longer valid. By way of example, in the case of a recommendation that a user purchase stock in Company A, news that Company A will experience a significant earnings shortfall may render the recommendation no good and thereby give rise to situation X. It will be apparent to those skilled in the art that numerous other events also may give rise to situation X.

Figure 9:
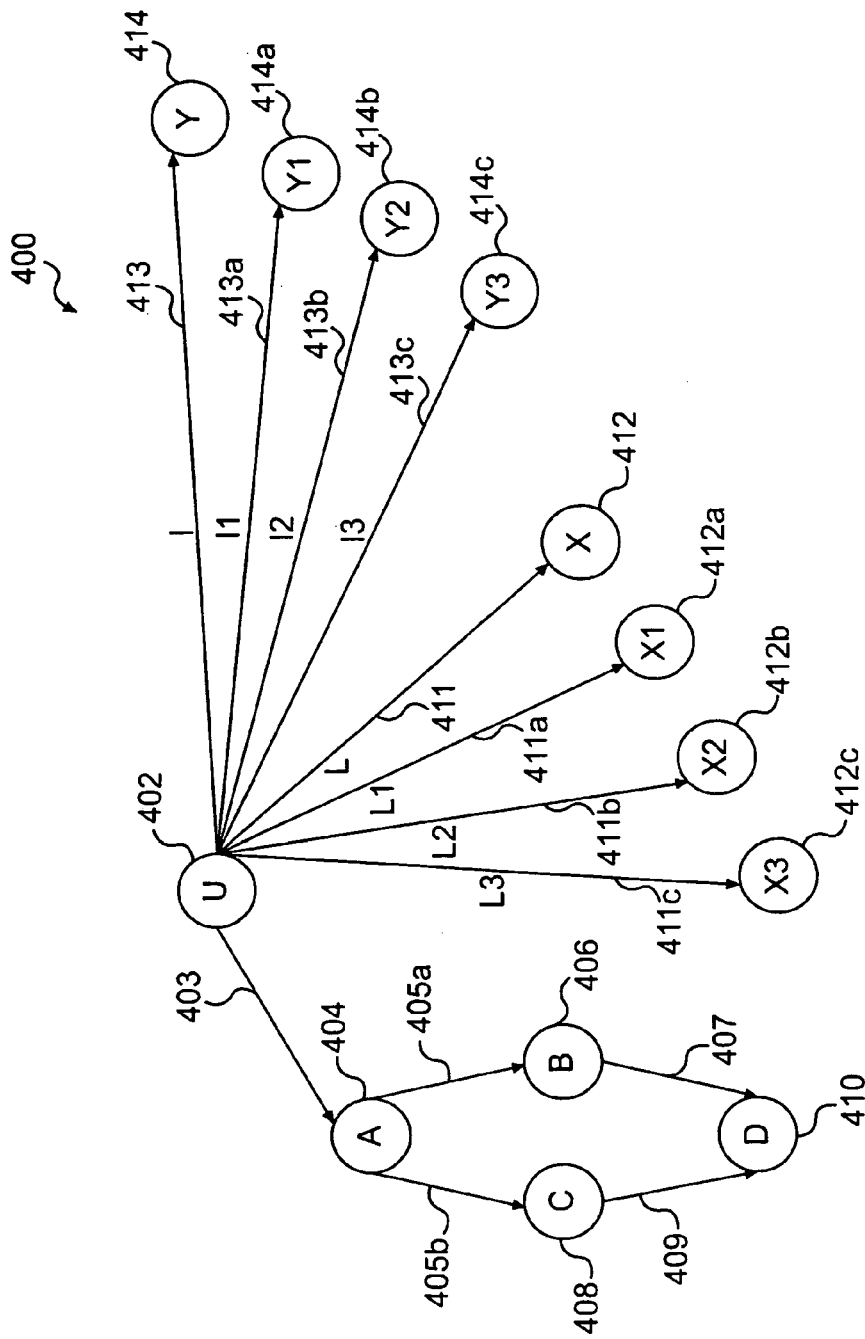
FIG. 9 is a graph illustrating a method for obtaining particular meanings for generalized concepts in accordance with one embodiment of the invention.

FIG. 9 is a graph 400 illustrating a method for obtaining particular meanings for generalized concepts in accordance with one embodiment of the invention. Graph 400 illustrates an exemplary scenario in which a business has classified its customers into concepts A, B, C, and D, where A is a general customer, B is a customer with high net worth, C is a customer with high risk tolerance, and D is a customer with high net worth and high risk tolerance. The business has two product lines X and Y, with X being recommended stocks and Y being recommended bonds. Within product lines X and Y, additional concepts X1, X2, X3, Y1, Y2, and Y3 are defined. In this exemplary scenario, the business implements its selling policy using the following business rules:

Rule No. 1: If A, then recommend X.
Rule No. 2: If B, then recommend X1.
Rule No. 3: If C, then recommend X2.
Rule No. 4: If D, then recommend X3.

As shown in FIG. 9, universal node 402 is coupled to classification node 404 by arrow 403. Classification node 404, which indicates concept A, is coupled to classification node 406, which indicates concept B, by arrow 405a and to classification node 408, which indicates concept C, by arrow 405b. Classification nodes 406 and 408 are each coupled to classification node 410, which indicates concept D, by arrows 407 and 409, respectively. Universal node 402 is coupled to nodes 412, 412a, 412b, and 412c by arrows 411, 411a, 411b, and 411c, respectively, and to nodes 414, 414a, 414b, and 414c by arrows 413, 413a, 413b, and 413c, respectively. Nodes 412, 412a, 412b, and 412c indicate concepts X, X1, X2, and X3, respectively. Nodes 414, 414a, 414b, and 414c indicate concepts Y, Y1, Y2, and Y3, respectively.

In this exemplary scenario, in the event Rule No. 1 fires, the specific instances of concept X, which are the items in list L, will be returned. In the event Rule No. 2 fires, the specific instances of concept X1, which are the items in list L1, will be returned. In the event Rule No. 3 fires, the specific instances of concept X2, which are the items in list L2, will be returned.

In the event Rule No. 4 fires, the specific instances of concept X3, which are the items in list L3, will be returned.

Figure 10:
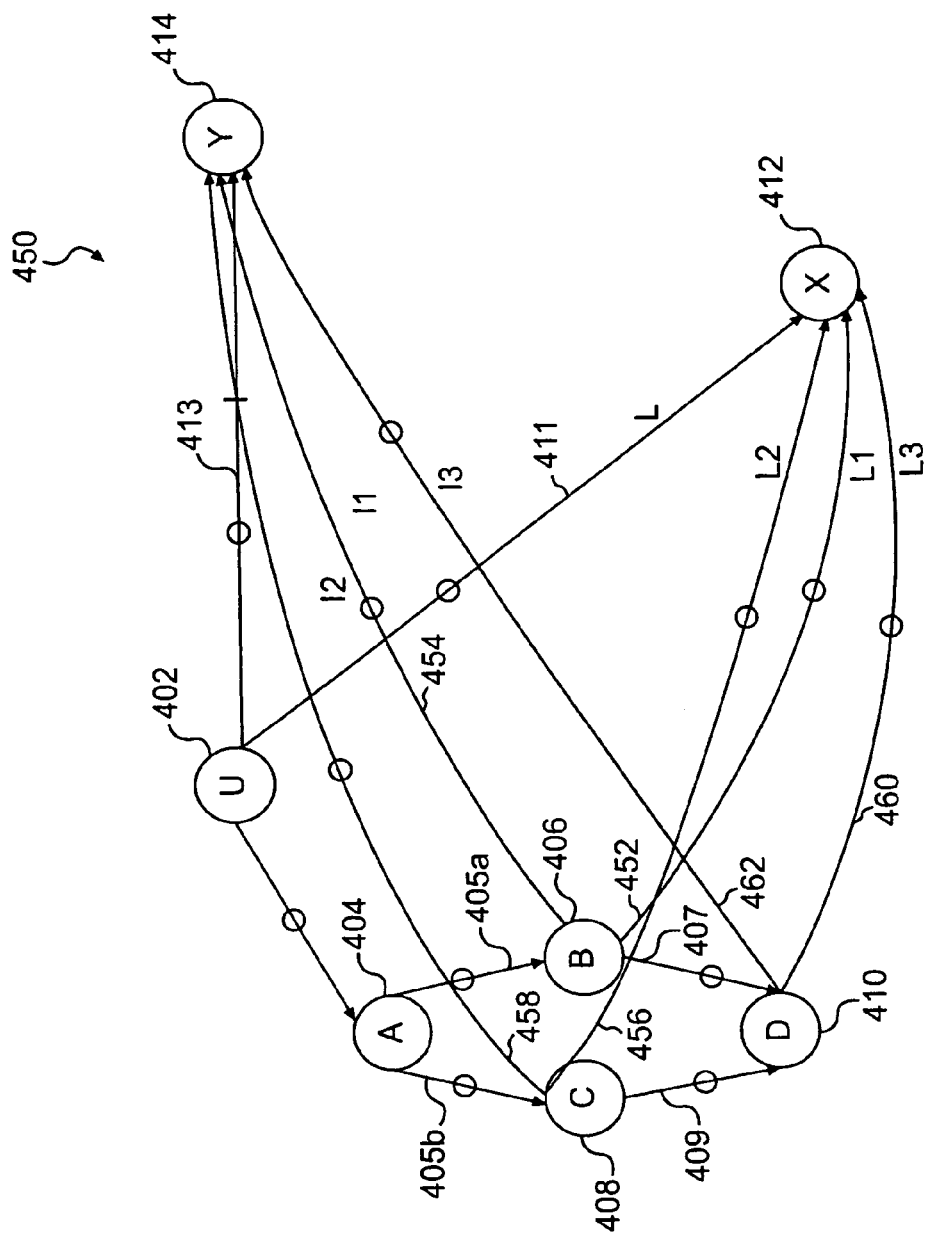
FIG. 10 is a directed acyclic graph illustrating a method for obtaining particular meanings for generalized concepts in accordance with another embodiment of the invention.

FIG. 10 is a directed acyclic graph 450 illustrating a method for obtaining particular meanings for generalized concepts in accordance with another embodiment of the invention. Directed acyclic graph 450 illustrates the exemplary scenario described above with reference to FIG. 9. The arrangement of nodes 402, 404, 406, 408, 410, 412, and 414 shown in FIG. 10 is the same as that shown in FIG. 9, except that a first class object is disposed between each of the nodes, as indicated by the symbol "O" on each of arrows 403, 405a, 405b, 407, 409, 411, and 413. As shown in FIG. 10, classification node 406, which indicates concept B, is coupled to node 412, which indicates concept X, by contextual arc 452. Classification node 406 is coupled to node 414, which indicates concept Y, by contextual arc 454. Classification node 408, which indicates concept C, is coupled to nodes 412 and 414 by contextual arcs 456 and 458, respectively. Classification node 410, which indicates concept C, is coupled to nodes 412 and 414 by contextual arcs 460 and 462, respectively. A first class object is disposed between each of classification nodes 406, 408, and 410 and each of nodes 412 and 414, as indicated by the symbol "O" on each of contextual arcs 452, 454, 456, 458, 460, and 462.

The intermediate first class objects disposed between two nodes, e.g., nodes 406 and 412, maintain the relationship between the two nodes. In the absence of such intermediate objects, the information regarding the relationship between the nodes would have to be stored in one of the nodes themselves. This is undesirable, however, because it presents complex memory management and programming issues as the system grows and the amount of relationship information stored in the nodes increases. The use of intermediate objects is a powerful solution for at least two reasons. First, the use of intermediate objects avoids the need to store relationship information in the nodes. As a result, the information stored in the nodes may be limited to strings, which the ontology treats as terms. Second, the use of intermediate objects increases the flexibility of the system by enabling additional relationships, e.g., time and precedence, to be defined in the contextual arcs, which the ontology uses to define the relationships between the terms stored in the nodes.

As shown in FIG. 10, nodes 412 and 414, which indicate concepts X and Y, respectively, are overloaded for concepts B, C, and D using the contextual arcs. This enables the business to implement the same selling policy defined in Rule Nos. 1-4 above with only the following business rule:

Rule No. 1: Recommend X.

When this rule fires, the specific instances of concept X that will be returned depend on the particular context. In the context of concept A, the items in list L will be returned (see arrow 411 in FIG. 10). In the context of concept B, the items in list L1 will be returned (see contextual arc 452 in FIG. 10). In the context of concept C, the items in list L2 will be returned (see contextual arc 456 in FIG. 10). In the context of concept D, the items in list L3 will be returned (see contextual arc 460 in FIG. 10).

Although the ontology may implement either of the above-described methods, the method described with reference to FIG. 10, i.e., the method in which contextual arcs are used, provides significant advantages in terms of both maintenance and also performance. As demonstrated above, the use of contextual arcs minimizes the number of business rules required to implement a given business policy. By minimizing the number of business rules required, a significant maintenance advantage is obtained because it is easier to manage fewer business rules, as illustrated below. The use of contextual arcs also provides a significant performance advantage.

To demonstrate the maintenance advantage that results from the use of contextual arcs, consider the steps a business manager would have to take to change the recommended product from X to Y in the exemplary scenario described above. Using the method described with reference to FIG. 9, i.e., the method without contextual arcs, the business manager would have to remove all of the business rules that recommend X, X1, X2, and X3 and add the following business rules to the ontology:

Rule No. 1: If A, then recommend Y.
Rule No. 2: If B, then recommend Y1.
Rule No. 3: If C, then recommend Y2.
Rule No. 4: If D, then recommend Y3.

In contrast, using contextual arcs, the business manager would only have to remove the business rule that recommends X and add the following business rule to the ontology:

Rule No. 1: Recommend Y.

The use of contextual arcs also makes it easier to change the recommended products or services. For example, in the exemplary scenario described above, consider the steps a business manager would have to take to change the list of recommended stocks L1. Without contextual arcs, the business manager would have to change the expression for the concept X1. With contextual arcs, the business manager would only have to change the expression for contextual arc 452, which extends from node 406, which indicates concept B, to node 412, which indicates concept X (see FIG. 10).

In summary, the present invention provides an information system that captures data from disparate sources and provides intelligent, personalized recommendations. The invention has been described herein in terms of several preferred embodiments. Other embodiments of the invention will be apparent to those skilled in the art from consideration of the specification and practice of the invention. The embodiments and preferred features described above should be considered exemplary, with the invention being defined by the appended claims.

What is claimed is:

1. An information system executed on one or more particular machines, comprising:
   a user and application interface;
   a reasoning engine in communication with the user and application interface;
   a knowledge manager in communication with the user and application interface and interfaced with the reasoning engine; and
   a distributed information service in communication with the reasoning engine, the knowledge manager, and the user and application interface;
   wherein the reasoning engine is configured to work in conjunction with the knowledge manager so as to enable the reasoning engine to handle events by executing one or more specific tasks prescribed by the knowledge manager to handle the events most appropriately; and
   wherein the reasoning engine includes:
      an interaction flow engine;
      an inference engine;
      a constraint satisfaction engine;
      an optimization engine;
      a categorization engine; and
      a data mining engine;
   wherein the interaction flow engine is in communication with the categorization engine, the inference engine, the constraint satisfaction engine and the optimization engine, the interaction flow engine being configured to invoke one or more of the categorization engine, the inference engine, the constraint satisfaction engine and the optimization engine to generate recommendations based on a profile of a user, rules obtained from the knowledge manager, constraints obtained from the knowledge manager, and an ontology.

2. An information system as recited in claim 1, wherein the knowledge manager includes an interaction flow model that is a repository for abstract situations to handle the events received by the reasoning engine, the situations defining the one or more tasks that are to be executed by the reasoning engine.

3. An information system as recited in claim 2, wherein the reasoning engine includes an interaction flow engine that is configured to receive the events, to invoke a categorization engine to categorize the events, and to interface with the interaction flow model of the knowledge manager.

4. An information system as recited in claim 3, wherein the interaction flow engine is configured to process through the one or more tasks by invoking at least one of an inference engine, a constraint satisfaction engine, an optimization engine, and an external application.

5. An information system as recited in claim 4, wherein the inference engine, which is part of the reasoning engine, executes at least one of the events in conjunction with rules obtained from a rule base model of the knowledge manager to generate a number of constraints that are communicated to the interaction flow engine of the reasoning engine.

6. An information system as recited in claim 5, wherein the constraint satisfaction engine executes at least one of the constraints received from the interaction flow engine and at least one of the constraints obtained from the constraint model, the constraint satisfaction engine being configured to produce a set of solutions.

7. An information system as recited in claim 6, wherein the optimization engine is configured to receive the set of solutions from the interaction flow engine and optimization model data to generate an optimized solution, the optimized solution being communicated to the distributed information service.

8. An information system as recited in claim 7, wherein the optimized solution is recorded.

9. An information system as recited in claim 1, wherein the profile includes interests of the user and wherein the constraints include business expertise and goals of the user.

10. An information system as recited in claim 1, wherein the interaction flow engine is configured to specify reasons regarding the generated recommendations, such reasons including identifying feedback received from the user, optimization models used to generate the recommendations, and the rules used to generate the recommendations.

11. An information system as recited in claim 1, wherein the interaction flow engine implements an interaction flow model of the knowledge manager to drive the generated recommendations.

12. An information system as recited in claim 1, wherein the knowledge manager includes:
an interaction flow model;
a rule base model;
a constraint model;
an optimization model;
a conceptual model;
a predictive model; and
the ontology.

13. An information system as recited in claim 12, wherein each of the interactive flow model and the ontology is in communication with the rule base model, the constraint model, and the optimization model, wherein the interactive flow model is configured to manage interaction flows with each of the rule base model, the constraint model, and the optimization model, and wherein interaction flows include a number of situations and each situation has a context description that contains event concepts that a situation of the number of situations requires to occur.

14. An information system as recited in claim 13, wherein the interaction flow model is configured to be compiled for execution by the interaction flow engine.

15. An information system as recited in claim 14, wherein the ontology of the knowledge manager defines a meaning of terms used by the interaction flow model.

* * * * *